(12) United States Patent
Yao et al.

(10) Patent No.: US 11,582,821 B2
(45) Date of Patent: *Feb. 14, 2023

(54) DATA TRANSMISSION METHOD, DATA TRANSMISSION APPARATUS, PROCESSOR, AND MOBILE TERMINAL

(71) Applicant: Honor Device Co., Ltd., Shenzhen (CN)

(72) Inventors: Songping Yao, Beijing (CN); Li Shen, Beijing (CN); Kun Li, Beijing (CN); Yingwei Li, Beijing (CN); Bangshi Yin, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 29 days.

This patent is subject to a terminal disclaimer.

(21) Appl. No.: 17/083,687

(22) Filed: Oct. 29, 2020

(65) Prior Publication Data

US 2021/0045176 A1 Feb. 11, 2021

Related U.S. Application Data

(63) Continuation of application No. 16/393,604, filed on Apr. 24, 2019, now Pat. No. 10,827,550, which is a
(Continued)

(51) Int. Cl.
*H04W 76/15* (2018.01)
*H04L 69/14* (2022.01)
(Continued)

(52) U.S. Cl.
CPC ............ *H04W 76/15* (2018.02); *H04L 67/60* (2022.05); *H04L 69/14* (2013.01); *H04L 67/02* (2013.01);
(Continued)

(58) Field of Classification Search
None
See application file for complete search history.

(56) References Cited

U.S. PATENT DOCUMENTS 10,314,096 B2 * 6/2019 Yao .................... H04L 67/60
10,827,550 B2 * 11/2020 Yao .................... H04L 67/60
(Continued)

FOREIGN PATENT DOCUMENTS

| CN | 101006737 A | 7/2007 |
| CN | 101420786 A | 4/2009 |

(Continued)

*Primary Examiner* — Hassan A Phillips
*Assistant Examiner* — Gautam Sharma
(74) *Attorney, Agent, or Firm* — Slater Matsil, LLP

(57) ABSTRACT

Embodiments of the present invention provide a data transmission method, a data transmission apparatus, a processor, and a mobile terminal. The data transmission method includes: determining, by a mobile terminal, whether to use multiple data channels to transmit to-be-transmitted data; if determining to use the multiple data channels to transmit the to-be-transmitted data, selecting, by the mobile terminal, at least two activated data channels for the to-be-transmitted data according to current traffic information and service quality information that are of the multiple data channels; and using, by the mobile terminal, the selected at least two data channels to transmit the to-be-transmitted data.

20 Claims, 13 Drawing Sheets

A mobile terminal determines whether to use multiple data channels to transmit to-be-transmitted data — S102

If determining to use the multiple data channels to transmit the to-be-transmitted data, the mobile terminal selects at least two activated data channels for the to-be-transmitted data according to current traffic information and service quality information that are of the multiple data channels — S104

The mobile terminal uses the selected at least two data channels to transmit the to-be-transmitted data — S106

Related U.S. Application Data continuation of application No. 15/557,163, filed as application No. PCT/CN2015/074102 on Mar. 12, 2015, now Pat. No. 10,314,096.

(51) Int. Cl.
| | | |
|---|---|---|
| *H04L 67/60* | | (2022.01) |
| *H04L 67/02* | | (2022.01) |
| *H04M 1/02* | | (2006.01) |
| *H04W 88/06* | | (2009.01) |

(52) U.S. Cl.
CPC ...... *H04M 1/0202* (2013.01); *H04M 2250/12* (2013.01); *H04W 88/06* (2013.01)

(56) References Cited

U.S. PATENT DOCUMENTS

| | | | |
|---|---|---|---|
| 2004/0057405 A1 | 3/2004 | Black | |
| 2007/0142058 A1* | 6/2007 | Matsumura | H04W 76/14 455/67.11 |
| 2008/0101396 A1* | 5/2008 | Miyata | H04L 12/66 370/408 |
| 2008/0130627 A1 | 6/2008 | Chen et al. | |
| 2008/0200195 A1 | 8/2008 | Abe et al. | |
| 2008/0259846 A1* | 10/2008 | Gonikberg | H04W 28/10 370/328 |
| 2009/0197589 A1* | 8/2009 | Kitazoe | H04W 76/25 455/422.1 |
| 2009/0215442 A1 | 8/2009 | Lindoff et al. | |
| 2012/0207021 A1 | 8/2012 | Rahman et al. | |
| 2013/0072214 A1 | 3/2013 | Quan et al. | |
| 2013/0077481 A1 | 3/2013 | Philavong et al. | |
| 2013/0114616 A1 | 5/2013 | Oh et al. | |
| 2013/0258893 A1 | 10/2013 | Baker et al. | |
| 2013/0311614 A1 | 11/2013 | Salkintiz | |
| 2021/0045176 A1* | 2/2021 | Yao | H04W 76/15 |

FOREIGN PATENT DOCUMENTS

| | | |
|---|---|---|
| CN | 101778114 A | 7/2010 |
| CN | 101883356 A | 11/2010 |
| CN | 102695207 A | 9/2012 |
| CN | 102724658 A | 10/2012 |
| CN | 103067978 A | 4/2013 |
| CN | 103200606 A | 7/2013 |
| CN | 103561414 A | 2/2014 |
| CN | 103582179 A | 2/2014 |
| EP | 2753120 A1 | 9/2014 |
| JP | 2011514047 A | 4/2011 |
| JP | 2011166251 A | 8/2011 |
| JP | 2014171077 A | 9/2014 |
| JP | 2014204393 A | 10/2014 |
| JP | 2014225743 A | 12/2014 |
| JP | 2014230104 A | 12/2014 |
| KR | 101243737 B1 | 3/2013 |
| RU | 2335854 C2 | 10/2008 |
| RU | 2526719 C2 | 8/2014 |

* cited by examiner

DATA TRANSMISSION METHOD, DATA TRANSMISSION APPARATUS, PROCESSOR, AND MOBILE TERMINAL

CROSS-REFERENCE TO RELATED APPLICATIONS

This application is a continuation of U.S. patent application Ser. No. 16/393,604, filed on Apr. 24, 2019, which is a continuation of U.S. patent application Ser. No. 15/557,163, filed on Sep. 11, 2017, now U.S. Pat. No. 10,314,096, which is a National Stage of International Application No. PCT/CN215/074102, filed Mar. 12, 2015. All of the aforementioned applications are hereby incorporated by reference in their entireties.

TECHNICAL FIELD

The present invention relates to the field of communications technologies, and in particular, to a data transmission method, a data transmission apparatus, a processor, and a mobile terminal.

BACKGROUND

With development of communications technologies, a mobile terminal is increasingly widely applied to all aspects of human life. People use mobile terminals to access the Internet anytime and anywhere, so as to have various network experience, such as watching a video, or uploading or downloading a file.

To help a mobile terminal user use the Internet and to improve user experience of using the mobile terminal, more mobile terminals support multiple cards, and more than a few mobile terminals can support concurrency of multi-card data services in terms of specification. However, a mobile terminal that currently supports the concurrency of multi-card data services has multiple data channels, but a data service of only one card can be activated by default, that is, only one data channel can be in an activated state. A multi-card mobile terminal using an Android™ operating system is used as an example. Generally, in the multi-card mobile terminal using the Android operating system, a WiFi data channel has a higher priority than a card data channel, that is, after the WiFi data channel is activated, the card data channel is deactivated. Therefore, at a same time, only one data channel of the multi-card mobile terminal using the Android™ operating system is in an activated state to perform data interaction. Data transmission for all data services is performed by using this activated data channel.

It may be learned that in an existing multi-card mobile terminal, data transmission efficiency is low and an available data channel is idle, thereby causing a waste of resources.

SUMMARY

In view of the foregoing problems, the prevent invention is proposed to provide a data transmission method, a data transmission apparatus, a processor, and a mobile terminal that overcome the foregoing problems or at least some problems.

According to an aspect of the present invention, a data transmission method is provided, including determining, by a mobile terminal, whether to use multiple data channels to transmit to-be-transmitted data and if determining to use the multiple data channels to transmit the to-be-transmitted data, selecting, by the mobile terminal, at least two activated data channels for the to-be-transmitted data according to current traffic information and service quality information that are of the multiple data channels. Additionally, the method includes using, by the mobile terminal, the selected at least two data channels to transmit the to-be-transmitted data.

According to another aspect of the present invention, a data transmission apparatus is provided, where the data transmission apparatus is disposed in a mobile terminal, and the apparatus includes a determining module, configured to determine whether to use multiple data channels to transmit to-be-transmitted data. The apparatus also includes a selection module, configured to if a determining result of the determining module is determining to use the multiple data channels to transmit the to-be-transmitted data, select at least two activated data channels for the to-be-transmitted data according to current traffic information and service quality information that are of the multiple data channels. Additionally, the apparatus includes a transmission module, configured to use the selected at least two data channels to transmit the to-be-transmitted data. According to still another aspect of the present invention, a processor is provided, where the processor is disposed in a mobile terminal, and the processor is configured to execute the following operations determining whether to use multiple data channels to transmit to-be-transmitted data, if determining to use the multiple data channels to transmit the to-be-transmitted data, selecting at least two activated data channels for the to-be-transmitted data according to current traffic information and service quality information that are of the multiple data channels, and using the selected at least two data channels to transmit the to-be-transmitted data.

According to yet another aspect of the present invention, a mobile terminal is provided, including a memory, a transceiver, the processor described above, and a bus, where the memory, the transceiver, and the processor perform communication by using the bus, where the memory is configured to store an instruction; the processor is configured to execute, according to the instruction stored in the memory, an operation executed by the foregoing processor; and the transceiver is configured to receive or send the to-be-transmitted data according to the operation executed by the processor.

According to another aspect of the present invention, a computer program is provided, where the computer program includes computer-readable code, and when the computer-readable code runs on a mobile terminal, the mobile terminal performs the foregoing data transmission method.

According to yet another aspect of the present invention, a computer-readable medium is provided, where the computer-readable medium stores the foregoing computer program.

Compared with the prior art, embodiments of the present invention have the following advantages.

In a data transmission solution provided in the embodiments of the present invention, when needing to transmit data, a mobile terminal may determine whether it is necessary to enable multi-data channel transmission; when determining that it is necessary to enable the multi-data channel transmission, the mobile terminal may select at least two activated data channels for to-be-transmitted data according to current traffic information and service quality information that are of the multiple data channels, so as to perform data transmission. According to the data transmission solution provided in the embodiments of the present invention, compared with using a single data channel to transmit data, using multiple data channels to transmit data at the same time greatly enhances data transmission efficiency; in addition, use of multiple data channels at the same time effectively avoids idleness and a waste of data channel resources.

BRIEF DESCRIPTION OF THE DRAWINGS

It becomes clear for persons skilled in the art to learn various other advantages and benefits by reading detailed description of the following implementation manners. Accompanying drawings are merely used for showing the implementation manners, but not considered as a limitation on the present invention. In all accompanying drawings, a same reference symbol is used to indicate a same part. In the accompanying drawings.

DETAILED DESCRIPTION OF ILLUSTRATIVE EMBODIMENTS

To make the objectives, features and advantages of embodiments of the present invention more comprehensible, the embodiments of the present invention are further illustrated in detail in the following with reference to the accompanying drawings and specific embodiments.

Embodiment 1

Figure 1:
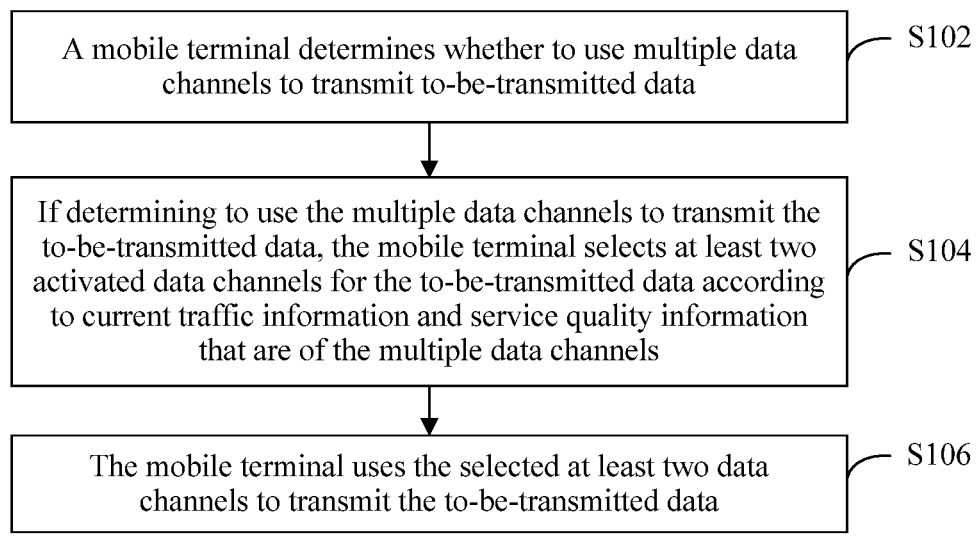
FIG. 1 is a flowchart of a data transmission method according to Embodiment 1 of the present invention.

Referring to FIG. 1, FIG. 1 shows a flowchart of a data transmission method according to Embodiment 1 of the present invention.

The data transmission method in this embodiment includes the following steps.

Step S102: A mobile terminal determines whether to use multiple data channels to transmit to-be-transmitted data.

Step S104: If determining to use the multiple data channels to transmit the to-be-transmitted data, the mobile terminal selects at least two activated data channels for the to-be-transmitted data according to current traffic information and service quality information that are of the multiple data channels.

When the to-be-transmitted data reaches a specific criterion, for example, a data amount exceeds a specific threshold; or there is a specific requirement for a speed of transmitting the to-be-transmitted data; or when the mobile terminal enables a multiple-data-channel transmission mode, it may be determined that it is necessary to use the multiple data channels of the mobile terminal to transmit the to-be-transmitted data.

The multiple data channels supported by the mobile terminal include data channels supported by all mobile terminal cards existing in the mobile terminal, such as a WiFi, second generation (2G), third generation (3G), or fourth generation (4G) data channel. There may be one WiFi data channel, or may be multiple different WiFi data channels.

When determining to use the multiple data channels to transmit the to-be-transmitted data, the mobile terminal may select at least two activated data channels for the to-be-transmitted data according to the current traffic information and the service quality information that are of the multiple data channels. During implementation, the mobile terminal may first select data channels, and then activate the selected data channels, or may first activate data channels, and then select the activated data channels. Persons skilled in the art may activate the data channels in an appropriate manner, such as activating a single data channel in a related technology; or setting an activate/deactivate flag bit for each data channel, and activating or deactivating a corresponding data channel by controlling the flag bit; or setting a unified enable/disable flag bit for the multiple-data-channel transmission mode in a mobile terminal system, and when the flag bit indicates that the multiple-data-channel transmission mode is enabled, activating multiple data channels at the same time, or when the multiple-data-channel transmission mode is disabled, disabling all data channels, or remaining only a default activated channel and disabling other data channels.

Current traffic information of a data channel indicates remaining available data traffic of the data channel, and service quality information of a data channel may indicate current service quality of the data channel, such as a rate and signal strength. A data channel with better service quality may be selected for the to-be-transmitted data according to service quality information of the data channel, so as to enhance a transmission speed and transmission efficiency that are of the to-be-transmitted data, and appropriately allocate data channels.

Step S106: The mobile terminal uses the selected at least two data channels to transmit the to-be-transmitted data.

After appropriate data channels are selected for the to-be-transmitted data, data transmission may be performed at the same time by using these selected data channels. The to-be-transmitted data may be data of one application, or may be data of multiple applications.

According to this embodiment, when needing to transmit data, a mobile terminal may determine whether it is necessary to enable multiple-data-channel transmission; when determining it is necessary to enable the multiple-data-channel transmission, the mobile terminal may select at least two data channels for the to-be-transmitted data according to current traffic information and service quality information that are of the multiple data channels, so as to perform data transmission. According to the data transmission method provided in this embodiment, compared with using a single data channel to transmit data, using multiple data channels to transmit data at the same time greatly enhances data transmission efficiency; in addition, use of multiple data channels at the same time effectively avoids idleness and a waste of data channel resources.

Embodiment 2

Figure 2A:
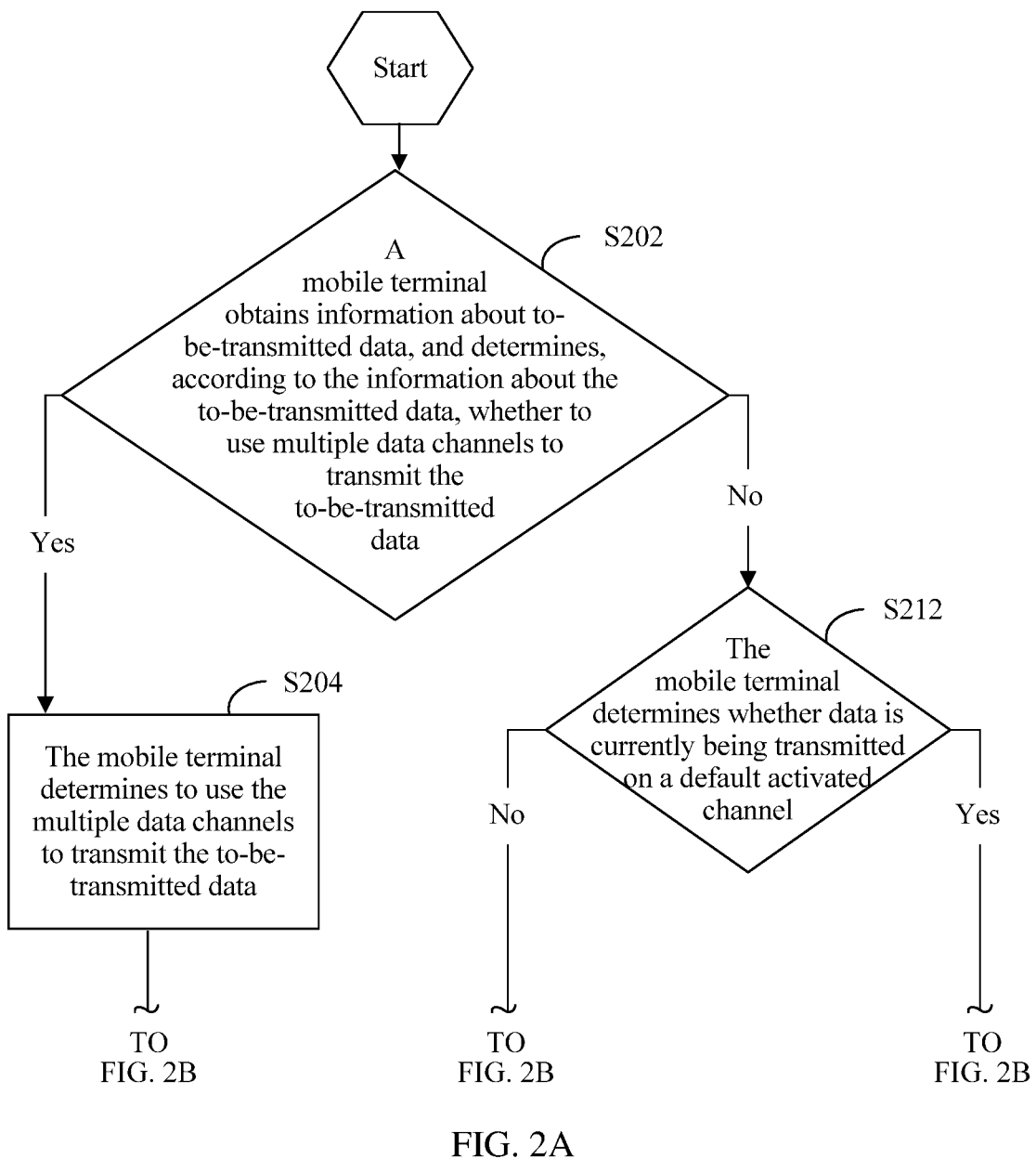
FIG. 2A and FIG. 2B are a flowchart of a data transmission method according to Embodiment 2 of the present invention.
Figure 2B:
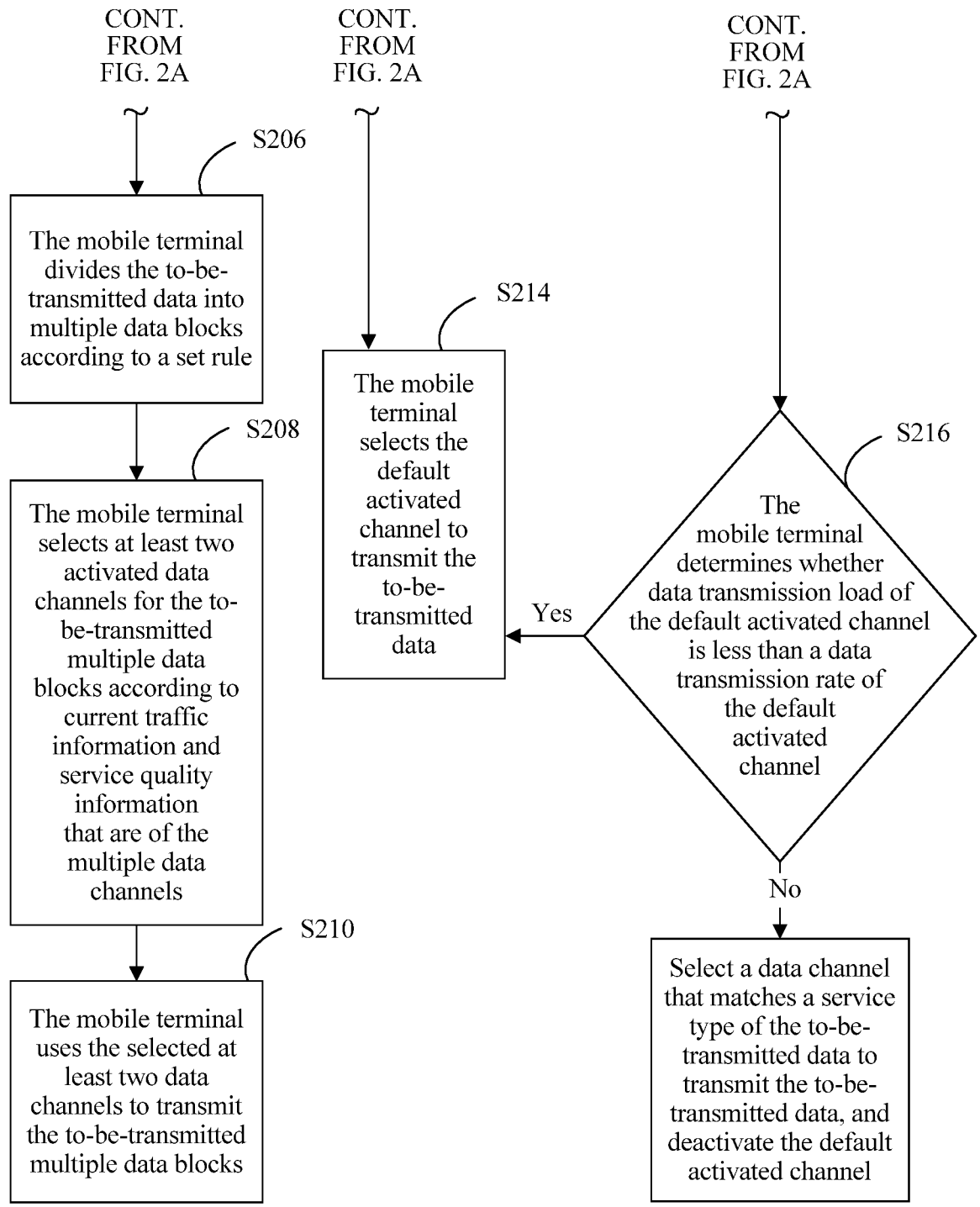

Referring to FIG. 2A and FIG. 2B, FIG. 2A and FIG. 2B show a flowchart of a data transmission method according to Embodiment 2 of the present invention.

A mobile terminal used in this embodiment is a multi-card mobile terminal. Multiple data channels of the mobile terminal include data channels supported by all mobile terminal cards of the mobile terminal. Based on this, the data transmission method in this embodiment includes the following steps.

Step S202: A mobile terminal obtains information about to-be-transmitted data, and determines, according to the information about the to-be-transmitted data, whether to use multiple data channels to transmit the to-be-transmitted data; if the mobile terminal determines to use the multiple data channels, performs step S204; or if the mobile terminal determines not to use the multiple data channels, performs step S212.

In this embodiment, the mobile terminal determines, according to the information about the to-be-transmitted data, whether to use multiple data channels to transmit the to-be-transmitted data. For example, the mobile terminal determines, according to a data amount of the to-be-transmitted data, whether to use multiple data channels to transmit the to-be-transmitted data. However, as described in Embodiment 1, determining, in another manner, for example, when there is a specific requirement for a speed of the to-be-transmitted data, or the mobile terminal enables a multiple-data-channel transmission mode, whether to use the multiple data channels of the mobile terminal to transmit the to-be-transmitted data also applies to the solution of this embodiment.

Step S204: The mobile terminal determines to use multiple data channels to transmit the to-be-transmitted data.

Step S206: The mobile terminal divides the to-be-transmitted data into multiple data blocks according to a specified rule.

The specified rule may be appropriately set according to an actual situation by persons skilled in the art, for example, the to-be-transmitted data is divided into multiple data blocks according to a fixed length, or the to-be-transmitted data is divided into multiple data blocks with a same length or different lengths according to a total length of the to-be-transmitted data. This is not limited in this embodiment of the present invention.

In this embodiment, it is assumed that the to-be-transmitted data is divided into multiple data blocks with a same length in advance according to the total length of the to-be-transmitted data. Dividing the to-be-transmitted data into multiple data blocks according to the specified rule before data transmission enhances data processing efficiency.

In addition, optionally, the divided multiple data blocks may form a block set or a data block pool so as to manage the data blocks. Certainly, specific storage space may be reserved as the data block pool or the block set, and when required, the divided data blocks are stored in the storage space.

Step S208: The mobile terminal selects at least two activated data channels for the to-be-transmitted multiple data blocks according to current traffic information and service quality information that are of the multiple data channels.

In this step, when selecting at least two activated data channels for the to-be-transmitted multiple data blocks, the mobile terminal may first select data channels, and then activate the selected data channels, or may first activate data channels, and then perform selection on the activated data channels. When first selecting data channels, and then activating the selected data channels, the mobile terminal may select at least two data channels for the to-be-transmitted data according to the current traffic information and the service quality information that are of the multiple data channels, and then activate the selected at least two data channels. When first activating data channels, and then performing selection on the activated data channels, the mobile terminal may first activate the multiple data channels, and then select at least two data channels for the to-be-transmitted data according to current traffic information and service quality information that are of the activated multiple data channels.

Preferably, after the to-be-transmitted data is divided into multiple data blocks, at least two data channels may be selected for the multiple to-be-transmitted data blocks.

During specific implementation, an optional manner is: determining remaining traffic of each data channel in the multiple data channels according to the current traffic information of the multiple data channels; determining, according to the remaining traffic of each data channel, data channels capable of transmitting at least one data block; and selecting at least two data channels for the to-be-transmitted multiple data blocks according to service quality information of the determined data channels. Another optional manner is: determining, by the mobile terminal according to the service quality information of the multiple data channels, data channels capable of transmitting the to-be-transmitted data blocks; and selecting at least two activated data channels for the to-be-transmitted multiple data blocks according to current traffic information of each data channel in the determined data channels.

The service quality information of a data channel may include signal quality and a data transmission rate that are of the data channel. In this case, at least two data channels may be selected for the to-be-transmitted multiple data blocks according to signal quality and data transmission rates that are of the determined data channels.

In this step, on the basis of determining that a data channel has sufficient remaining traffic, an appropriate data channel may be selected for the to-be-transmitted data according to service quality information of the data channel that has sufficient data traffic, such as signal quality and a data transmission rate. This avoids a problem that data cannot be properly transmitted due to use of a data channel that has insufficient remaining traffic, and a problem that data transmission efficiency is low due to use of data channels whose signal quality is not good enough and/or whose data transmission speeds are low. Further, when data channels are specifically allocated to the to-be-transmitted data blocks, more to-be-transmitted data blocks may be allocated to some data channels having good service quality according to the signal quality and the data transmission rates that are of the data channels. Accordingly, fewer to-be-transmitted data blocks are allocated to some other data channels having relatively poor service quality. This enables load of data channels to be more balanced, and ensures efficient data transmission.

Step S210: The mobile terminal uses the selected at least two data channels to transmit the to-be-transmitted multiple data blocks.

A feasible manner of implementing this step includes: selecting, by the mobile terminal, some or all of the data blocks from the multiple data blocks, and determining a currently available data channel for each of the selected data blocks; and establishing an HTTP (Hypertext Transfer Protocol) connection on the determined data channel, and using the HTTP connection to transmit the to-be-transmitted data block. During specific implementation, the foregoing feasible manner may include the following steps.

Step S2102: Select a data block from the to-be-transmitted multiple data blocks, and determine a currently available data channel for the selected data block.

After multiple data channels used to transmit the multiple data blocks are determined, for each data block, a data channel used to transmit the data block is determined.

Step S2104: Establish an HTTP connection on the determined data channel, and use the HTTP connection to transmit the to-be-transmitted data.

In this embodiment, the to-be-transmitted data is transmitted by using the HTTP connection. However, persons skilled in the art should understand that in actual use, transmission of the to-be-transmitted data is not limited to using the HTTP connection, and another appropriate connection manner may also be applied.

Step S2106: Determine whether there is still a to-be-transmitted data block; if there is no to-be-transmitted data block, this data transmission process ends; or if there is still a to-be-transmitted data block, determine whether there is still an available data channel; and if there is still an available data channel, go back to step S2102 and continue execution.

That is, it is continuously determined whether there is still a data block that is not transmitted. If there is still a data block that is not transmitted, it is determined whether there is still an available data channel. If there is still an available data channel, go back to step S2102, that is, one data block is selected from the remaining to-be-transmitted data blocks, and an available data channel is selected for the selected data block; an HTTP connection is established on the selected data channel, and the HTTP connection is used to transmit the to-be-transmitted data. If there is no available data channel, persons skilled in the art may perform appropriate setting according to an actual requirement. For example, when data traffic of all data channels is used up, data transmission is stopped, or a user is prompted whether to perform excessive data transmission.

Therefore, in the foregoing process of this embodiment, efficient data transmission of to-be-transmitted data in a mobile terminal is implemented.

Step S212: If determining to use only a single data channel to transmit the to-be-transmitted data, the mobile terminal determines whether data is currently being transmitted on a default activated channel; if no data is currently being transmitted on the default activated channel, performs step S214; or if data is currently being transmitted on the default activated channel, performs step S216.

There is a setting for a default activated channel in all mobile terminals, for example, when a mobile terminal uses a WiFi connection, a current default activated channel of the mobile terminal is the WiFi data channel; when a mobile terminal does not use a WiFi connection, a current default activated channel of the mobile terminal is set by a system in advance, for example, may be a 2G, 3G, or 4G data channel.

Step S214: If no data is currently being transmitted on the default activated channel, the mobile terminal selects the default activated channel to transmit the to-be-transmitted data.

Step S216: If data is currently being transmitted on the default activated channel, the mobile terminal determines whether data transmission load of the default activated channel is less than a data transmission rate of the default activated channel; and if the data transmission load of the default activated channel is less than the data transmission rate of the default activated channel, selects the default activated channel to transmit the to-be-transmitted data; or if the data transmission load of the default activated channel is not less than the data transmission rate of the default activated channel, selects a data channel that matches a service type of the to-be-transmitted data to transmit the to-be-transmitted data, and deactivates the default activated channel.

If data transmission load of a data channel is less than a data transmission rate, it may be foreseen that data that is currently being transmitted on the data channel is to be completely transmitted in a short time. In this case, the data channel may be still selected to perform subsequent data transmission. Otherwise, it is necessary to select a data channel that matches a service type of the to-be-transmitted data to transmit the to-be-transmitted data, for example, service data of a 2G network may be transmitted on the 2G, 3G, or 4G data channel, or service data of a 3G network may be transmitted on the 3G or 4G data channel. Certainly, alternatively, the service data of the 2G network may be transmitted on the 2G data channel, the service data of the 3G network may be transmitted on the 3G data channel, and service data of a 4G network may be transmitted on the 4G data channel. At the same time, the default activated channel is deactivated, and the selected data channel that matches the service type of the to-be-transmitted data is activated so as to perform data transmission.

In this step, when a data channel that matches a service type of the to-be-transmitted data is selected to transmit the to-be-transmitted data and the default activated channel is deactivated, a manner includes: determining whether the data channel that matches the service type of the to-be-transmitted data has remaining data traffic; if the data channel that matches the service type of the to-be-transmitted data has remaining data traffic, the data channel that matches the service type of the to-be-transmitted data is selected to transmit the to-be-transmitted data, and the default activated channel is deactivated; or if the data channel that matches the service type of the to-be-transmitted data does not have remaining data traffic, the default activated channel is still selected to transmit the to-be-transmitted data.

In the foregoing process of this embodiment, efficient transmission of to-be-transmitted data on multiple data channels is implemented, and effective selection and utilization of a data channel when a single data channel is used to transmit data are implemented, thereby enhancing a data transmission speed and data transmission efficiency.

The solution is not limited herein. On the basis of the foregoing process, optimization processing may be further performed on the solution of this embodiment. The optimization processing may include one or more of the following three cases.

Case 1: In a process of transmitting the to-be-transmitted data, processing is performed on a data channel on which a network exception occurs.

A manner includes: after the to-be-transmitted data is divided into multiple data blocks according to a specified rule, storing the divided multiple data blocks in a data block pool, where the data block pool is configured to store a data block. In this case, when it is determined, in a process of transmitting the to-be-transmitted data, that a data channel on which a network exception occurs exists in the selected at least one data channel, a data block that is currently being transmitted on the data channel on which a network exception occurs is re-stored in the data block pool, and a currently available data channel is re-selected for the data block that is re-stored in the data block pool.

Case 2: In a process of transmitting the to-be-transmitted data, it is detected whether a data channel whose data traffic is used up exists in the selected at least one data channel; if a data channel whose data traffic is used up exists in the selected at least one data channel, the data channel whose data traffic is used up is stopped being used to transmit the to-be-transmitted data.

For data channels using mobile cellular data traffic, there may be data traffic limits on these data channels. In this case, if in the process of transmitting the to-be-transmitted data, it is detected that data traffic of a specific data channel is used up, the data channel whose data traffic is used up is stopped being used to transmit the to-be-transmitted data, so as to reduce extra economic expenditure of a user.

Case 3: In a process of transmitting the to-be-transmitted data, a temperature of the mobile terminal is detected; if the temperature of the mobile terminal exceeds a set threshold, transmission of the to-be-transmitted data is stopped.

After the multiple data channels of the mobile terminal are enabled to perform data transmission, the temperature of the mobile terminal may rise. When the temperature rises to some extent, performance of the mobile terminal may be affected, and more seriously, an element in the mobile terminal may be irreversibly damaged. Therefore, in actual use, an appropriate temperature threshold may be set by persons skilled in the art, or a default system temperature threshold of a mobile terminal is used. When a temperature of the mobile terminal exceeds the threshold, data transmission is stopped so as to protect the mobile terminal.

It should be noted that during specific execution of the foregoing three cases, there is no definite sequence between each other, or the three cases may be concurrently executed.

According to this embodiment, efficient transmission of to-be-transmitted data on multiple data channels is implemented, and data transmission efficiency is enhanced, thereby avoiding idleness and a waste of data channel resources. In addition, effective selection and utilization of a data channel when a single data channel is used to transmit data are further implemented, thereby enhancing a speed and efficiency of data transmission on a single data channel. Optimization processing for a network exception, traffic exhaustion, and a temperature exception protects a mobile terminal, and ensures data validity and integrity, thereby further enhancing data transmission efficiency.

Embodiment 3

Figure 3:
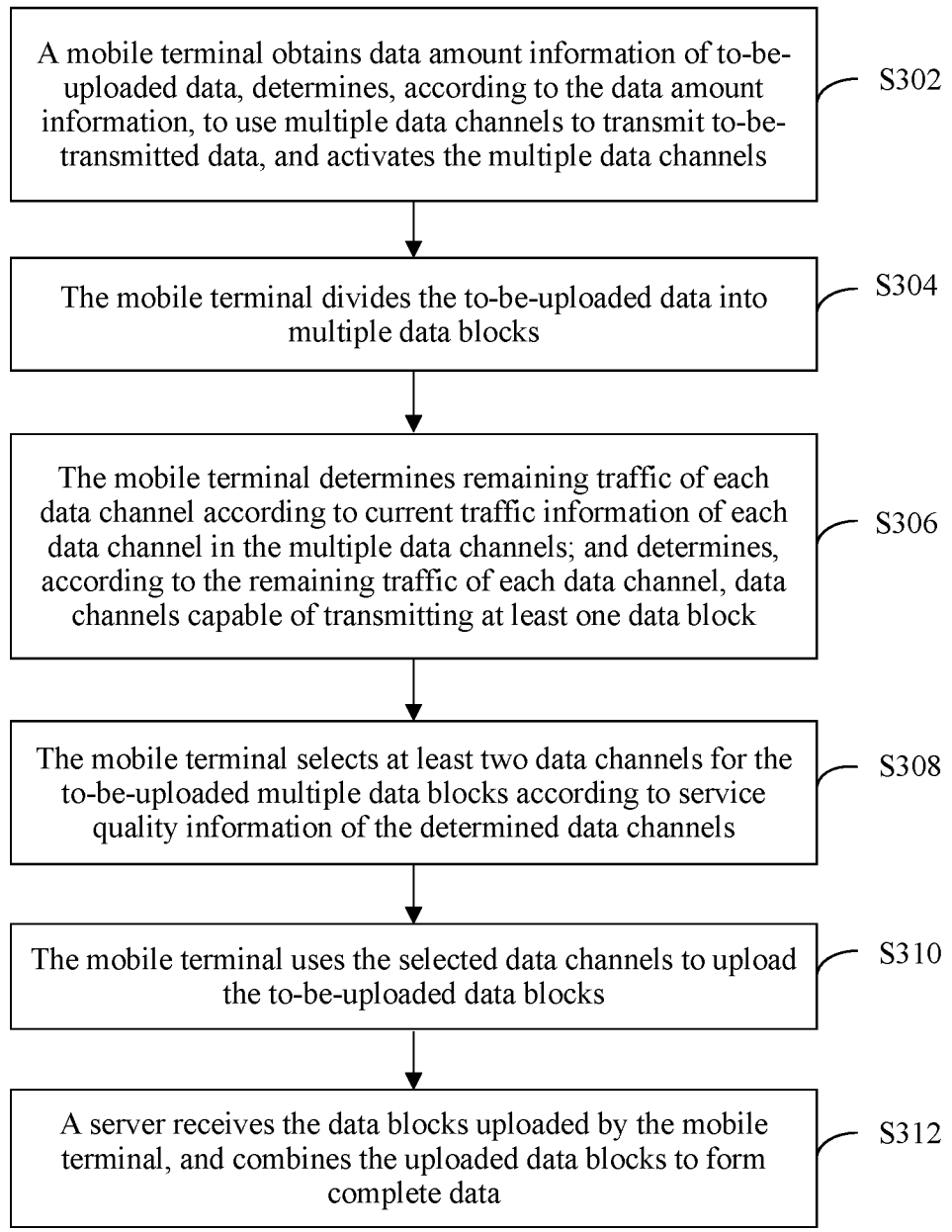
FIG. 3 is a flowchart of a data transmission method according to Embodiment 3 of the present invention.

Referring to FIG. 3, FIG. 3 shows a flowchart of a data transmission method according to Embodiment 3 of the present invention.

In this embodiment, a data transmission solution of the present invention is described by using an example in which a mobile terminal uploads data. The data transmission method in this embodiment includes the following steps.

Step S302: A mobile terminal obtains data amount information of to-be-uploaded data, determines, according to the data amount information, to use multiple data channels to transmit to-be-transmitted data, and activates the multiple data channels.

In this embodiment, it is assumed that WiFi, 2G, 3G, and 4G data channels exist in the mobile terminal, and when determining to use multiple data channels to transmit the to-be-transmitted data, the mobile terminal activates the multiple data channels. It is assumed that a data amount of the to-be-uploaded data is 600 M, and all the foregoing four data channels can upload data. The mobile terminal determines to use the four data channels at the same time to upload the data and activates the four data channels.

Step S304: The mobile terminal divides the to-be-uploaded data into multiple data blocks.

In this embodiment, it is assumed that the 600 M to-be-uploaded data is divided into six data blocks. A data amount of each data block is 100 M.

Step S306: The mobile terminal determines remaining traffic of each data channel according to current traffic information of each data channel in the multiple data channels; and determines, according to the remaining traffic of each data channel, data channels capable of transmitting at least one data block.

In this embodiment, it is assumed that the WiFi data channel imposes no limitation on data traffic, and initial data traffic of the 2G, 3G, and 4G data channels is 200 M. Current traffic of the 2G, 3G, and 4G data channels is respectively 90 M, 70 M, and 600 M. It can be learned that all the data channels have remaining traffic, and the remaining traffic is greater than a data amount of a single data block. Therefore, all the data channels are available data channels.

Step S308: The mobile terminal selects at least two data channels for the to-be-uploaded multiple data blocks according to service quality information of the determined data channels.

In this embodiment, the service quality information includes signal strength and a data transmission rate. It is assumed that the data channels ranking in descending order of signal strength are successively: the WiFi data channel, the 4G data channel, the 3G data channel, and the 2G data channel; similarly, the data channels ranking in descending order of a data transmission rate are successively: the WiFi data channel, the 4G data channel, the 3G data channel, and the 2G data channel. In actual use, if signal strength of a specific data channel is not suitable for data transmission, or a data transmission rate is relatively low, using this data channel to transmit data may be excluded. Otherwise, if signal strength of a data channel is suitable for data transmission, or a data transmission rate is not relatively low the data channel may be used to transmit data. In this embodiment, it is assumed that all the four data channels may be used to upload data.

Step S310: The mobile terminal uses the selected data channels to upload the to-be-uploaded data blocks.

In this step, the mobile terminal may upload four of the six data blocks by using the WiFi data channel, the 4G data channel, the 3G data channel, and the 2G data channel at the same time. For the remaining two data blocks, because data transmission rates of data channels are different, one may be transmitted on a specific data channel, and then the remaining data block is continuously transmitted. For example, it is assumed that a data transmission rate of the WiFi data channel is 25 M/S, a data transmission rate of the 4G data channel is 20 M/S, a data transmission rate of the 3G data channel is 10 M/S, and a data transmission rate of the 2G data channel is 5 M/S. In this case, for a 100 M data block, time required for uploading on the WiFi data channel is 4 S, time required for uploading on the 4G data channel is 5 S, time required for uploading on the 3 G data channel is 10 S, and time required for uploading on the 2G data channel is 20 S. In this case, one of the remaining two data blocks may be uploaded by using the WiFi data channel, and the other may be uploaded by using the 4G data channel.

Step S312: A server receives the data blocks uploaded by the mobile terminal, and combines the uploaded data blocks to form complete data.

In this step, any appropriate related technology may be used to implement processing on the multiple uploaded data blocks performed by the server, for example, according to a data block identifier, or packet header information. This is not limited in this embodiment of the present invention.

According to this embodiment, simultaneous uploading of data by a mobile terminal by using multiple data channels is implemented, and data transmission efficiency is enhanced, thereby avoiding idleness and a waste of data channel resources.

Embodiment 4

Figure 4A:
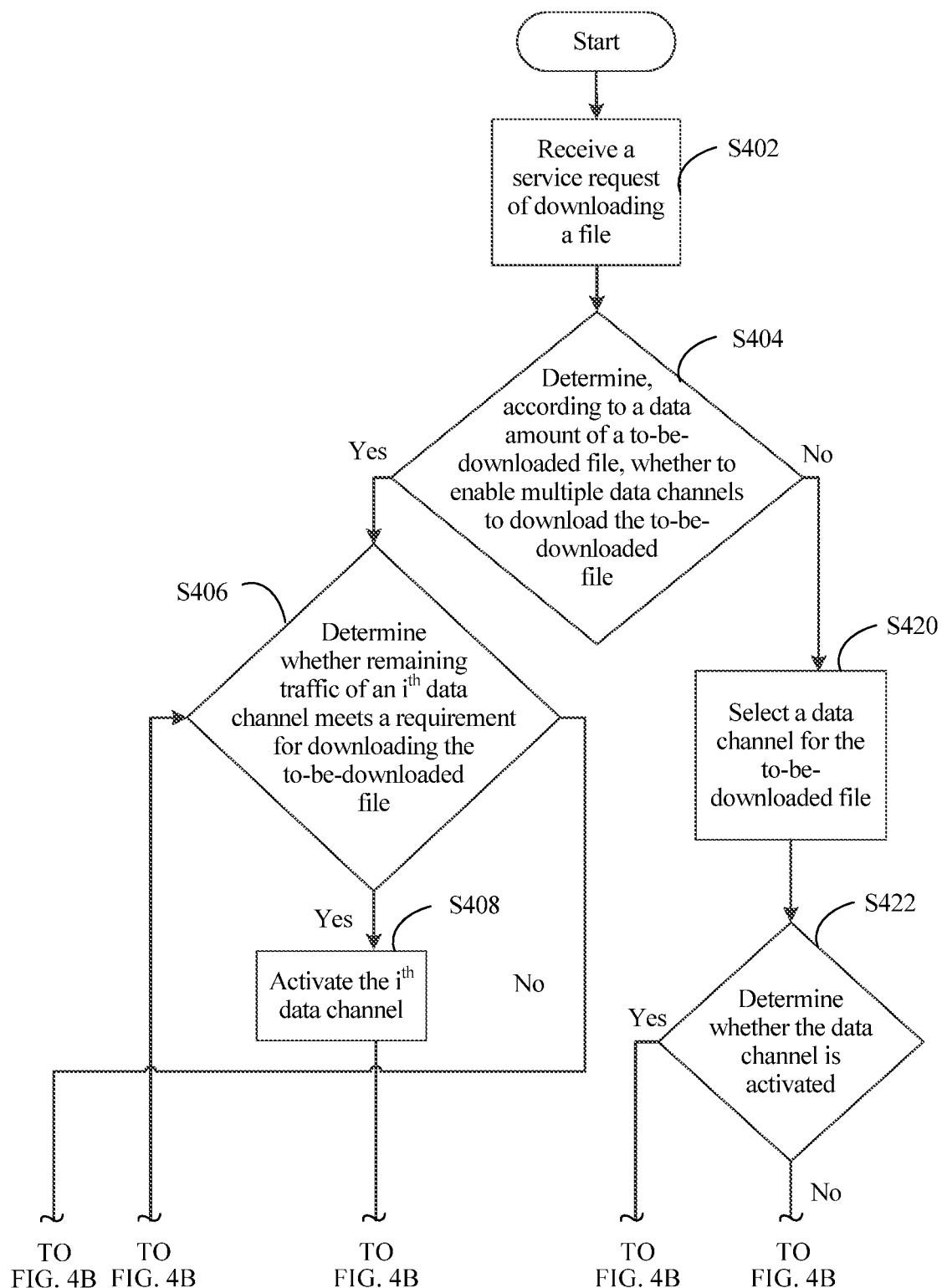
FIG. 4A and FIG. 4B are a flowchart of a data transmission method according to Embodiment 4 of the present invention.
Figure 4B:
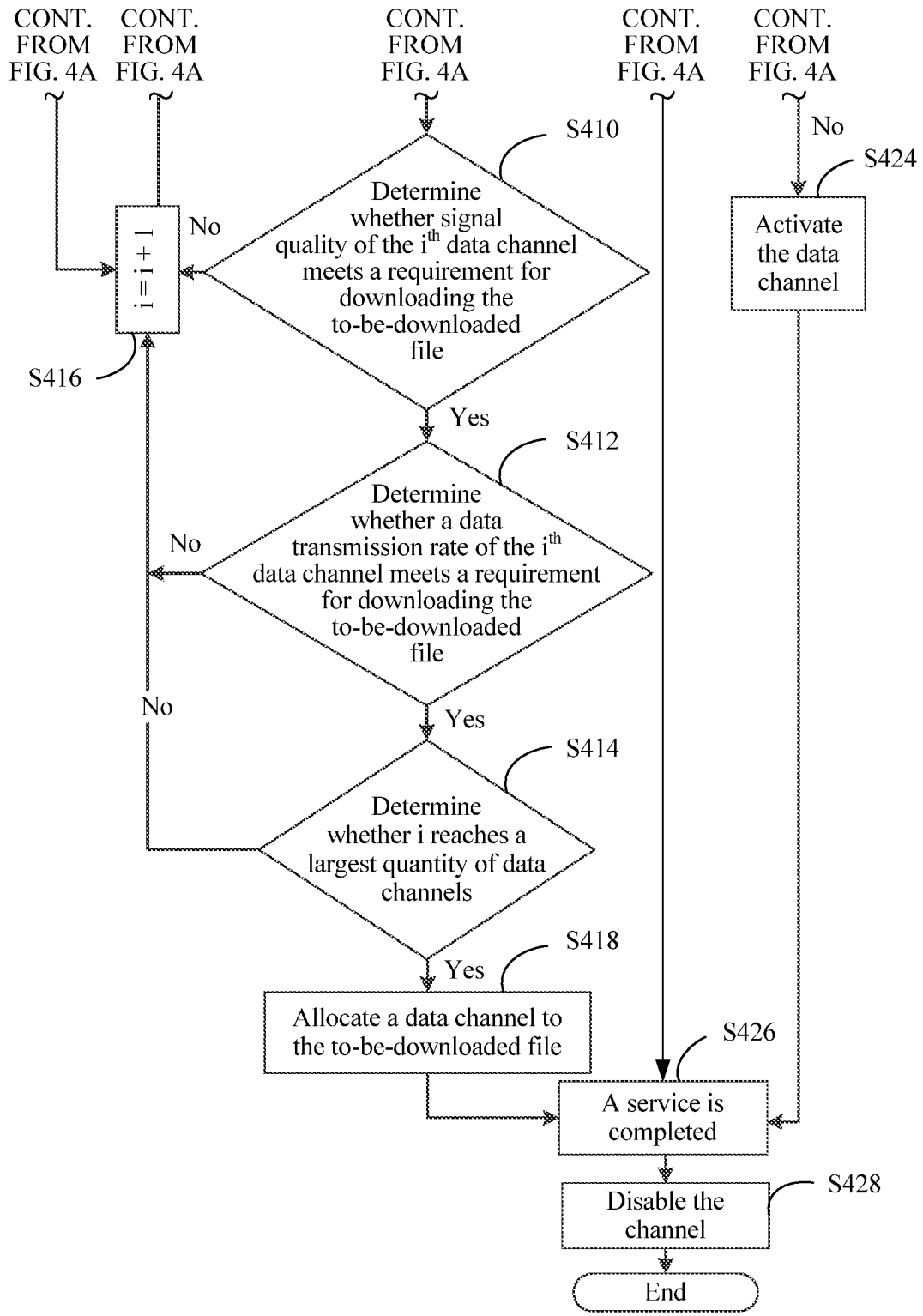

Referring to FIG. 4A and FIG. 4B, FIG. 4A and FIG. 4B show a flowchart of a data transmission method according to Embodiment 4 of the present invention.

In this embodiment, a data transmission solution of the present invention is described by using an example in which a mobile terminal downloads data, and specifically, the mobile terminal downloads a file. The data transmission method in this embodiment includes the following steps.

Step S402: A mobile terminal receives a service request of downloading a file.

The service request carries information about a to-be-downloaded file, including information about a data amount of the to-be-downloaded file.

Step S404: The mobile terminal determines, according to a data amount of a to-be-downloaded file, whether to enable multiple data channels to download the to-be-downloaded file. If the mobile terminal determines to enable the multiple data channels, performs step S406; or if the mobile terminal determines not to enable the multiple data channels, performs step S420.

For example, the mobile terminal determines whether the data amount of the to-be-downloaded file is greater than M. M may be appropriately set by persons skilled in the art according to an actual requirement. When the data amount of the to-be-downloaded file is greater than M, concurrent downloading is enabled, and the multiple data channels of the mobile terminal are used to download data; otherwise, when the data amount of the to-be-downloaded file is not greater than M, concurrent downloading is not enabled.

Step S406: The mobile terminal determines whether remaining traffic of an $i^{th}$ data channel meets a requirement for downloading the to-be-downloaded file. If the remaining traffic of the $i^{th}$ data channel meets the requirement, performs step S408; or if the remaining traffic of the $i^{th}$ data channel does not meet the requirement, performs step S416.

$1 \leq i \leq N$, that is, i is a positive integer greater than or equal to 1, and less than or equal to a quantity N of all data channels supported by all mobile terminal cards existing in the mobile terminal. An initial value of i is 1. By using i to indicate a sequence number of a data channel, cyclic determining and data processing may be performed on multiple data channels of the mobile terminal.

Step S408: The mobile terminal activates the $i^{th}$ data channel.

Step S410: The mobile terminal determines whether signal quality of the $i^{th}$ data channel meets a requirement for downloading the to-be-downloaded file. If the signal quality of the $i^{th}$ data channel meets the requirement, performs step S412; or if the signal quality of the $i^{th}$ data channel does not meet the requirement, performs step S416.

In this embodiment, the signal quality includes one or more of QoS parameters such as signal strength, a signal-to-noise ratio, and signal stability. For example, when signal strength of an LTE network is greater than −110 dbm, it is considered that signal quality of the data channel meets the requirement for downloading the to-be-downloaded file. For another example, when signal strength of a WCDMA network is greater than −90 dbm, it is considered that signal quality of the data channel meets the requirement for downloading the to-be-downloaded file. For still another example, when signal strength of a GSM network is greater than −90 dbm, it is considered that signal quality of the data channel meets the requirement for downloading the to-be-downloaded file. This is not limited in this embodiment of the present invention.

Step S412: The mobile terminal determines whether a data transmission rate of the $i^{th}$ data channel meets a requirement for downloading the to-be-downloaded file. If the data transmission rate of the $i^{th}$ data channel meets the requirement, performs step S414; or if the data transmission rate of the $i^{th}$ data channel does not meet the requirement, performs step S416.

In this embodiment, the data transmission rate refers to a downloading rate of a data channel. For example, when a downloading rate of the long term evolution (LTE) network is less than 200 Kb/s, it is considered that a data transmission rate of the data channel does not meet the requirement for downloading the to-be-downloaded file. For another example, when a downloading rate of the wideband code division multiple access (WCDMA) network is less than 50 Kb/s, it is considered that a data transmission rate of the data channel does not meet the requirement for downloading the to-be-downloaded file. For still another example, when a downloading rate of the global system for mobile communications (GSM) network is less than 10 Kb/s, it is considered that a data transmission rate of the data channel does not meet the requirement for downloading the to-be-downloaded file. This is not limited in this embodiment of the present invention.

Step S414: The mobile terminal determines whether i reaches a largest quantity of data channels. If i reaches a largest quantity of data channels, performs step S418; or if i does not reach a largest quantity of data channels, performs step S416.

That is, the mobile terminal determines whether i reaches N.

Step S416: If i=i+1, go back to step S406.

In this embodiment, a meaning of i=i+1 is the same as a meaning in normal program design, and may be understood as: i is considered as a variable, and a value obtained each time is equal to i plus 1.

Step S418: The mobile terminal allocates a data channel to the to-be-downloaded file, and then performs step S426.

Figure 5A:
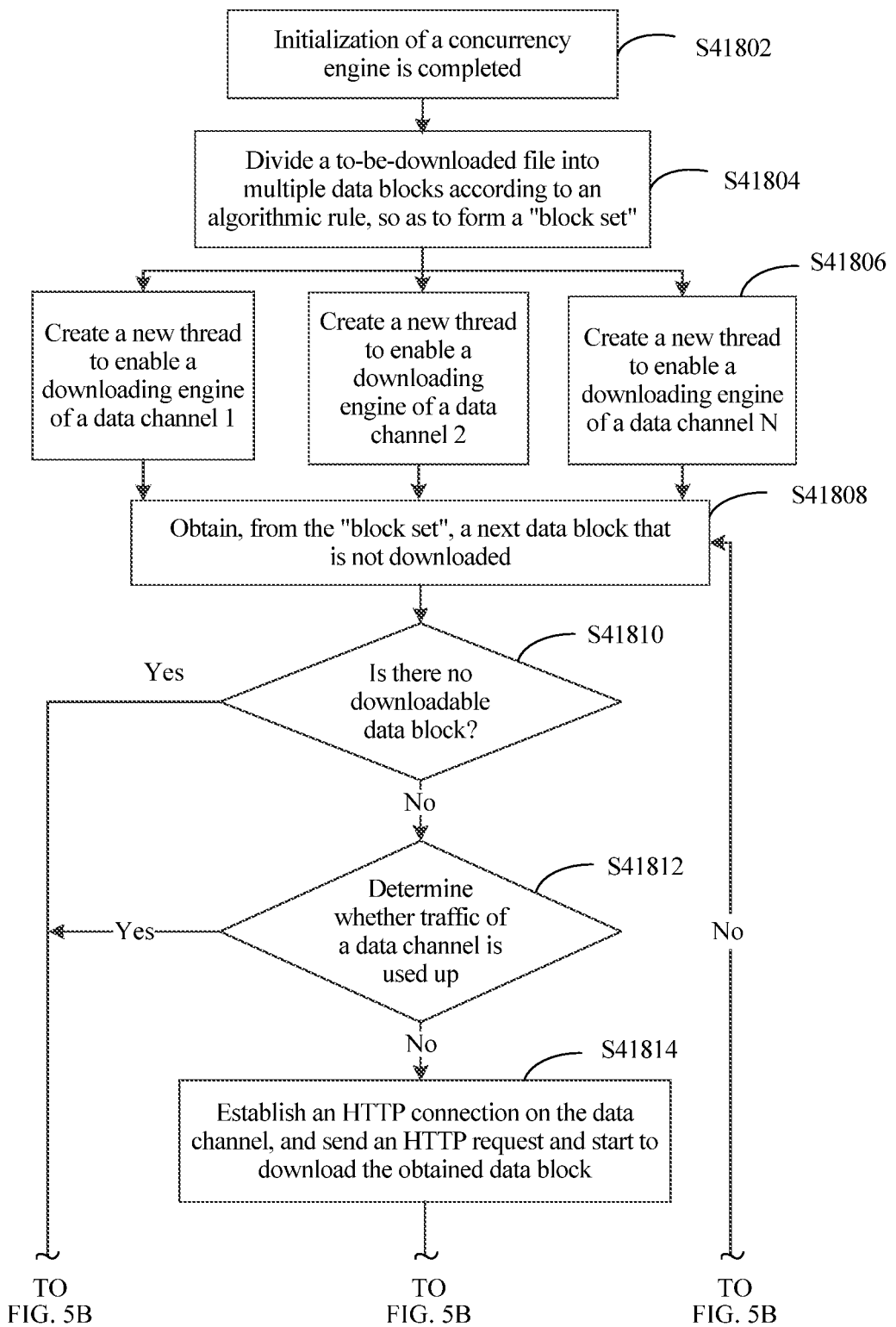
FIG. 5A and FIG. 5B are a flowchart of data channel allocation according to an embodiment shown in FIG. 4A and FIG. 4B.
Figure 5B:
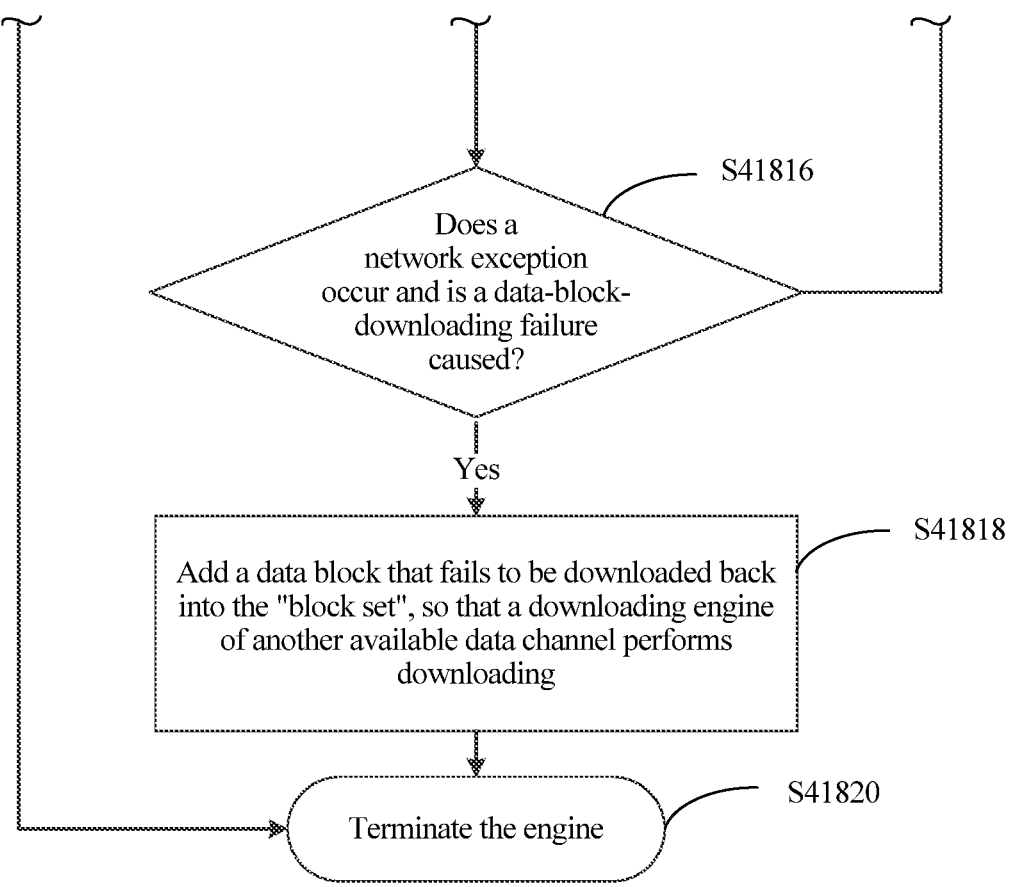

In this embodiment, a process of allocating a data channel to the to-be-downloaded file by the mobile terminal is shown in FIG. 5A and FIG. 5B. The process includes the following steps.

Step S41802: Initialization of a concurrency engine is completed.

In this embodiment, the concurrency engine is used to activate multiple data channels. That the initialization of a concurrency engine is completed means that the multiple data channels have been activated. A specific implementation form of the concurrency engine may be implemented by persons skilled in the art according to an actual situation. This is not limited in this embodiment of the present invention.

Step S41804: Divide the to-be-downloaded file into multiple data blocks according to an algorithmic rule, so as to form a "block set."

For example, for downloading a to-be-downloaded file of a 4G service type from a 4G data channel, a feasible division manner is as follows.

(1) If 20 MB≤SIZE≤(100 MB−1), the to-be-downloaded file is divided into six blocks.

(2) If 100 MB≤SIZE≤(200 MB−1), the to-be-downloaded file is divided into eight blocks.

(3) If 200 MB≤SIZE≤(300 MB−1), the to-be-downloaded file is divided into ten blocks.

(4) If 300 MB≤SIZE, the to-be-downloaded file is divided into multiple blocks, and each block is always 30 MB.

For another example, for downloading a to-be-downloaded file of a 2G service type from a 2G data channel, a feasible division manner is as follows.

(1) If 2 MB≤SIZE≤(10 MB−1), the to-be-downloaded file is divided into six blocks.

(2) If 10 MB≤SIZE≤(20 MB−1), the to-be-downloaded file is divided into eight blocks.

(3) If 20 MB≤SIZE≤(30 MB−1), the to-be-downloaded file is divided into ten blocks.

(4) If 30 MB≤SIZE, the to-be-downloaded file is divided into multiple blocks, and each block is always 3 MB.

It should be noted that all the foregoing division manners are examples. In an actual application, persons skilled in the art may perform any appropriate division according to an actual situation, including division of the data block and division of a range of the data amount. This is not limited in this embodiment of the present invention.

Step S41806: For each data channel in the multiple data channels, create a new thread, which is used to enable a downloading engine of the data channel.

In this embodiment, the downloading engine is used to download the to-be-downloaded file. A specific implementation form of the downloading engine may be implemented by persons skilled in the art in any appropriate manner according to an actual situation. This is not limited in this embodiment of the present invention.

Step S41808: Obtain, from the "block set," a data block that is not downloaded.

Step S41810: Determine whether there is no downloadable data block. If there is no downloadable data block, perform step S41820; or if there is a downloadable data block, perform step S41812.

Step S41812: Determine whether data traffic of this data channel is used up. If the data traffic of this data channel is used up, perform step S41820; or if the data traffic of this data channel is not used up, perform step S41814.

Step S41814: Establish HTTP connection on this data channel, and send an HTTP request and start to download the obtained data block.

In this embodiment, the HTTP connection may be established by a downloading engine of each data channel, for example, a downloading engine of a data channel 1 establishes an HTTP connection of the data channel 1 on a network interface of the data channel 1; and a downloading engine of a data channel 2 establishes an HTTP connection of the data channel 2 on a network interface of the data channel 2. By analogy, a downloading engine of a data channel N establishes an HTTP connection of the data channel N on a network interface of the data channel N.

Step S41816: Determine whether a network exception occurs and a data-block-downloading failure is caused. If a network exception occurs and a data-block-downloading failure is caused, perform step S41818; or if a network exception does not occur and no data-block-downloading failure is caused, go back to step S41808.

Step S41818: Add a data block that fails to be downloaded back into the "block set," so that a downloading engine of another available data channel performs downloading.

Step S41820: Terminate the downloading engine of this data channel.

After all data channels complete downloading of corresponding data blocks, the process goes to step S426.

Step S420: The mobile terminal selects a data channel for the to-be-downloaded file.

Figure 6A:
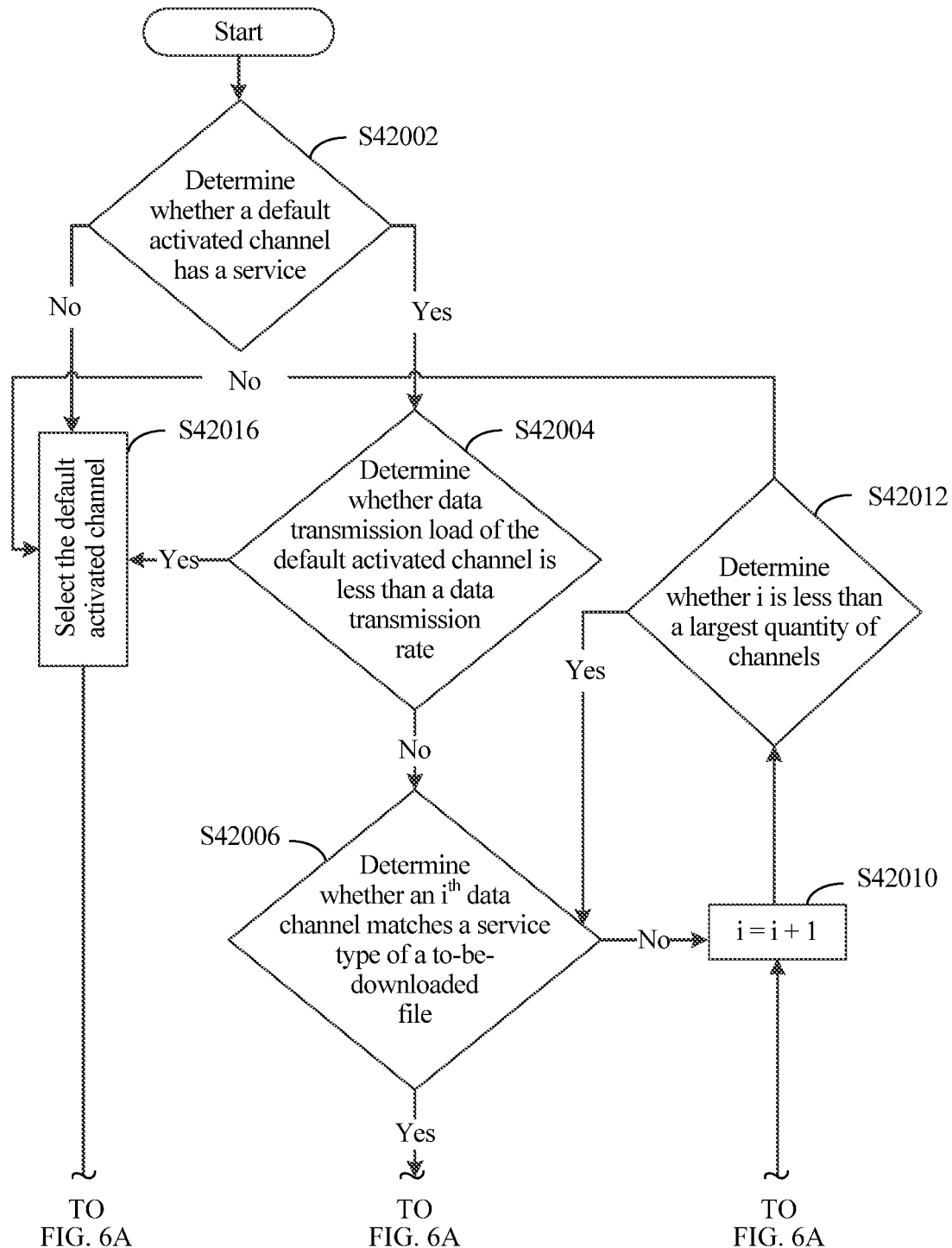
FIG. 6A and FIG. 6B are a flowchart of channel selection according to an embodiment shown in FIG. 4A and FIG. 4B.
Figure 6B:
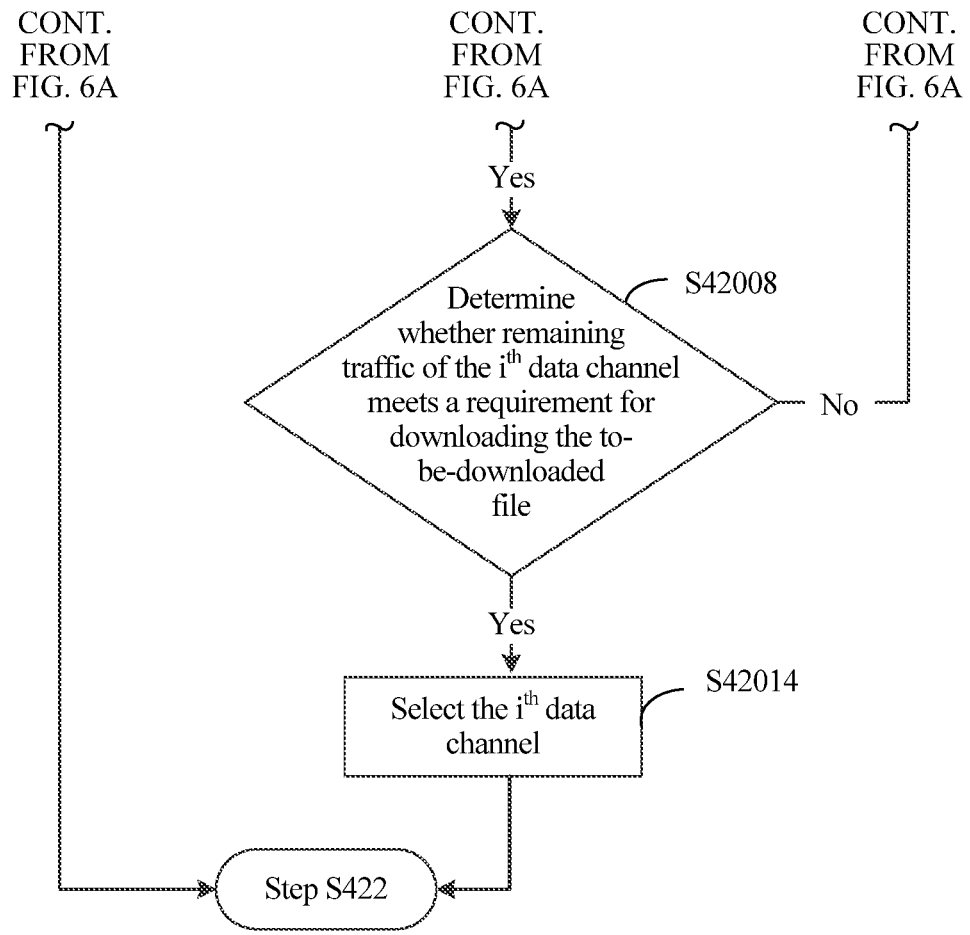

In this embodiment, a process of selecting a data channel for the to-be-downloaded file by the mobile terminal is shown in FIG. 6A and FIG. 6B. The process includes the following steps.

Step S42002: Determine whether a default activated channel has a service. If the default activated channel has a service, perform step S42004; or if the default activated channel does not have a service, perform step S42016.

That is, it is determined whether data is currently being transmitted on the default activated channel.

Step S42004: Determine whether data transmission load of the default activated channel is less than a data transmission rate. If the data transmission load of the default activated channel is less than the data transmission rate, perform step S42016; or if the data transmission load of the default activated channel is not less than the data transmission rate, perform step S42006.

Step S42006: Determine whether the $i^{th}$ data channel matches a service type of the to-be-downloaded file. If the $i^{th}$ data channel matches the service type of the to-be-downloaded file, perform step S42008; or if the $i^{th}$ data channel does not match the service type of the to-be-downloaded file, perform step S42010.

Step S42008: Determine whether remaining traffic of the $i^{th}$ data channel meets a requirement for downloading the to-be-downloaded file. If the remaining traffic meets the requirement, perform step S42014; or if the remaining traffic does not meet the requirement, perform step S42010.

Step S42010: If i=i+1, perform step S42012.

Step S42012: Determine whether i reaches the largest quantity of data channels. If i reaches the largest quantity of data channels, perform step S42006; or if i does not reach the largest quantity of data channels, perform step S42016.

That is, it is determined whether i reaches N.

Step S42014: Select the $i^{th}$ data channel, and perform step S422.

Step S42016: Select the default activated channel, and perform step S422.

Step S422: The mobile terminal determines whether the data channel selected for the to-be-downloaded file is activated. If the data channel is activated, the data channel is used to download the file, and performs step S426; or if the data channel is not activated, performs step S424.

Step S424: The mobile terminal activates the data channel selected for the to-be-downloaded file, uses the data channel to download the file, and performs step S426.

Step S426: The mobile terminal completes downloading of the to-be-downloaded file.

Step S428: The mobile terminal disables the multiple data channels.

According to this embodiment, downloading of to-be-downloaded data on multiple data channels is implemented, and data downloading efficiency is enhanced, thereby avoiding idleness and a waste of data channel resources. In addition, intelligent selection of a data channel when a single data channel is used to download data is implemented, thereby enhancing the data downloading efficiency.

Embodiment 5

Figure 7:
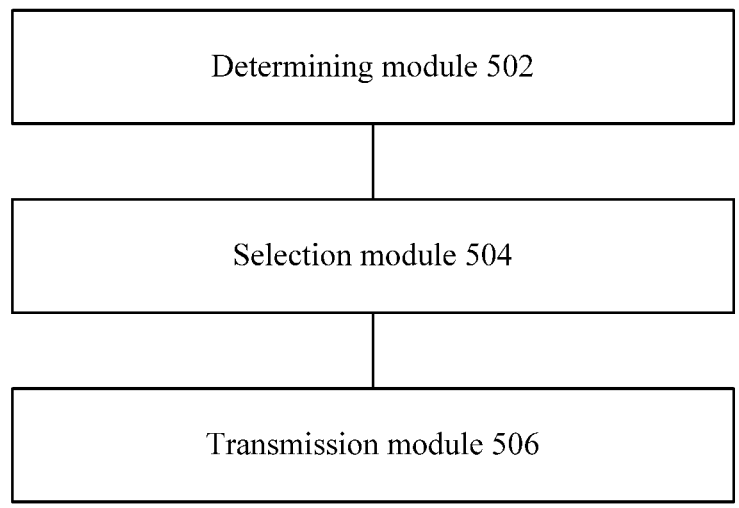
FIG. 7 is a structural block diagram of a data transmission apparatus according to Embodiment 5 of the present invention.

Referring to FIG. 7, FIG. 7 shows a structural block diagram of a data transmission apparatus according to Embodiment 5 of the present invention.

The data transmission apparatus in this embodiment is disposed in a mobile terminal, where the data transmission apparatus includes: a determining module 502, configured to determine whether to use multiple data channels to transmit to-be-transmitted data; a selection module 504, configured to: if a determining result of the determining module 500 is determining to use the multiple data channels to transmit the to-be-transmitted data, select at least two activated data channels for the to-be-transmitted data according to current traffic information and service quality information that are of the multiple data channels; and a transmission module 506, configured to use the selected at least two data channels to transmit the to-be-transmitted data.

The data transmission apparatus in this embodiment is configured to implement a corresponding data transmission method in the foregoing multiple method embodiments. According to this embodiment, the data transmission apparatus disposed in a mobile terminal may determine whether it is necessary to enable multiple-data-channel transmission; when determining that it is necessary to enable the multiple-data-channel transmission, the data transmission apparatus may select at least two data channels for to-be-transmitted data according to current traffic information and service quality information that are of the multiple data channels, so as to perform data transmission. According to the data transmission method provided in this embodiment, compared with using a single data channel to transmit data, using multiple data channels to transmit data at the same time greatly enhances data transmission efficiency; in addition, use of multiple data channels at the same time effectively avoids idleness and a waste of data channel resources.

Embodiment 6

Figure 8:
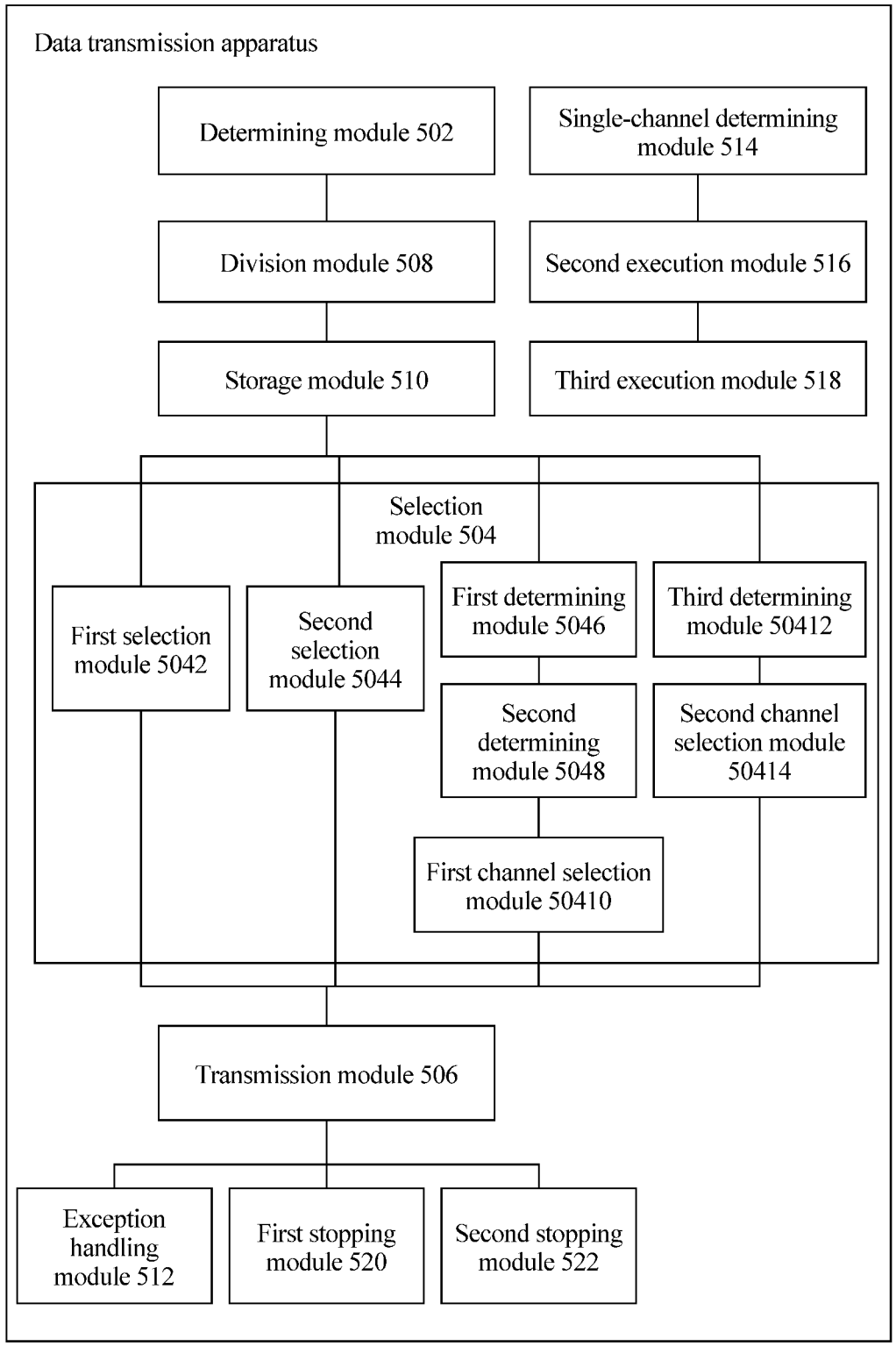
FIG. 8 is a structural block diagram of a data transmission apparatus according to Embodiment 6 of the present invention.

Referring to FIG. 8, FIG. 8 shows a structural block diagram of a data transmission apparatus according to Embodiment 6 of the present invention.

The data transmission apparatus in this embodiment is a data transmission apparatus obtained by optimizing a data transmission apparatus in Embodiment 5 in multiple aspects. The optimized data transmission apparatus includes a determining module 502, a selection module 504, and a transmission module 506 that are in Embodiment 5. On this basis, preferably, the selection module 504 includes: a first selection module 5042, configured to select at least two data channels for the to-be-transmitted data according to the current traffic information and the service quality information that are of the multiple data channels, and activate the selected at least two data channels; or a second selection module 5044, configured to activate the multiple data channels; and select at least two data channels for the to-be-transmitted data according to current traffic information and service quality information that are of the activated multiple data channels.

Preferably, the data transmission apparatus in this embodiment further includes: a division module 508, configured to: before the selection module 504 selects at least one data channel for the to-be-transmitted data according to the current traffic information and the service quality information that are of the multiple data channels, divide the to-be-transmitted data into multiple data blocks according to a specified rule. In this case, the selection module 504 is configured to select at least two data channels for the to-be-transmitted multiple data blocks according to the current traffic information and the service quality information that are of the multiple data channels.

In this case, preferably, the selection module 504 includes: a first determining module 5046, configured to determine remaining traffic of each data channel in the multiple data channels according to the current traffic information of the multiple data channels; a second determining module 5048, configured to determine, according to the remaining traffic of each data channel, data channels capable of transmitting at least one data block; and a first channel selection module 50410, configured to select at least two data channels for the to-be-transmitted multiple data blocks according to service quality information of the determined data channels. Alternatively, the selection module 504 includes: a third determining module 50412, configured to determine data channels capable of transmitting the to-be-transmitted data blocks according to the service quality information of the multiple data channels; and a second channel selection module 50414, configured to select at least two activated data channels for the to-be-transmitted multiple data blocks according to current traffic information of each data channel in the determined data channels.

Preferably, the service quality information includes: signal quality and a data transmission rate.

Preferably, the transmission module 506 is configured to select a data block from the multiple data blocks, and determine a currently available data channel for the selected data block; and establish an HTTP connection on the determined data channel, and use the HTTP connection to transmit the to-be-transmitted data block.

Preferably, the data transmission apparatus in this embodiment further includes: a storage module 510, configured to: after the division module 508 divides the to-be-transmitted data into multiple data blocks according to a specified rule, store the divided multiple data blocks in a data block pool, where the data block pool is configured to store a data block; and an exception handling module 512, configured to determine, in a process of transmitting the to-be-transmitted data, that a data channel on which a network exception occurs exists in the selected at least two data channels; and re-store, in the data block pool, a data block that is currently being transmitted on the data channel on which a network exception occurs, and re-select a currently available data channel for the data block that is re-stored in the data block pool.

Preferably, the data transmission apparatus in this embodiment further includes: a single-channel determining module 514, configured to: if the determining result of the determining module 502 is determining to use only a single data channel to transmit the to-be-transmitted data, determine whether data is currently being transmitted on a default activated channel; a second execution module 516, configured to: if no data is currently being transmitted on the default activated channel, select the default activated channel to transmit the to-be-transmitted data; and a third execution module 518, configured to: if data is currently being transmitted on the default activated channel, determine whether data transmission load of the default activated channel is less than a data transmission rate of the default activated channel; and if the data transmission load of the default activated channel is less than the data transmission rate of the default activated channel, select the default activated channel to transmit the to-be-transmitted data; or if the data transmission load of the default activated channel is not less than the data transmission rate of the default activated channel, select a data channel that matches a service type of the to-be-transmitted data to transmit the to-be-transmitted data, and deactivate the default activated channel.

Preferably, when selecting the data channel that matches the service type of the to-be-transmitted data to transmit the to-be-transmitted data, and deactivating the default activated channel, the third execution module 518 is configured to: determine whether the data channel that matches the service type of the to-be-transmitted data has remaining data traffic; and if the data channel that matches the service type of the to-be-transmitted data has remaining data traffic, select the data channel that matches the service type of the to-be-transmitted data to transmit the to-be-transmitted data, and deactivate the default activated channel; or if the data channel that matches the service type of the to-be-transmitted data does not have remaining data traffic, select the default activated channel to transmit the to-be-transmitted data.

Preferably, the data transmission apparatus in this embodiment further includes: a first stopping module 520, configured to detect whether a data channel whose data traffic is used up exists in the selected at least two data channels; and if a data channel whose data traffic is used up exists in the selected at least two data channels, stop using the data channel whose data traffic is used up to transmit the to-be-transmitted data.

Preferably, the data transmission apparatus in this embodiment further includes: a second stopping module 522, configured to detect a temperature of the mobile terminal in the process of transmitting the to-be-transmitted data; and if the temperature of the mobile terminal exceeds a set threshold, stop transmission of the to-be-transmitted data.

Preferably, the mobile terminal in this embodiment is a multi-card mobile terminal, and the multiple data channels of the mobile terminal include data channels supported by all mobile terminal cards of the mobile terminal.

The data transmission apparatus in this embodiment is configured to implement a corresponding data transmission method in the foregoing multiple method embodiments, and has beneficial effects of a corresponding method embodiment. Details are not described herein.

Embodiment 7

This embodiment of the present invention further provides a processor. The processor may be a central processing unit (CPU for short), or may be another general purpose processor, a digital signal processor (DSP), an application-specific integrated circuit (ASIC), a field programmable gate array (FPGA) or another programmable logical device, a discrete gate or transistor logic device, a discrete hardware assembly, or the like. The general purpose processor may be a microprocessor or may be any conventional processor, or the like.

The processor is disposed in a mobile terminal, and the processor is configured to execute the following operations: determining whether to use multiple data channels to transmit to-be-transmitted data; if determining to use the multiple data channels to transmit the to-be-transmitted data, selecting at least two activated data channels for the to-be-transmitted data according to current traffic information and service quality information that are of the multiple data channels; and using the selected at least two data channels to transmit the to-be-transmitted data.

Preferably, the step of selecting at least two activated data channels for the to-be-transmitted data according to current traffic information and service quality information that are of the multiple data channels includes: selecting at least two data channels for the to-be-transmitted data according to the current traffic information and the service quality information that are of the multiple data channels, and activating the selected at least two data channels; or activating the multiple data channels; and selecting at least two data channels for the to-be-transmitted data according to current traffic information and service quality information that are of the activated multiple data channels.

Preferably, before the step of selecting at least two activated data channels for the to-be-transmitted data according to current traffic information and service quality information that are of the multiple data channels, the processor is further configured to execute the following operation: dividing the to-be-transmitted data into multiple data blocks according to a specified rule; and the step of selecting at least two activated data channels for the to-be-transmitted data according to the current traffic information and the service quality information that are of the multiple data channels includes: selecting at least two activated data channels for the to-be-transmitted multiple data blocks according to current traffic information and service quality information that are of each data channel in the multiple data channels.

Preferably, the step of selecting at least two activated data channels for the to-be-transmitted data according to current traffic information and service quality information that are of the multiple data channels includes: determining remaining traffic of each data channel in the multiple data channels according to the current traffic information of the multiple data channels; determining, according to the remaining traffic of each data channel, data channels capable of transmitting at least one data block; and selecting at least two activated data channels for the to-be-transmitted multiple data blocks according to service quality information of the determined data channels.

Preferably, the step of selecting at least two activated data channels for the to-be-transmitted data according to current traffic information and service quality information that are of the multiple data channels includes: determining data channels capable of transmitting the to-be-transmitted data blocks according to the service quality information of the multiple data channels; and selecting at least two activated data channels for the to-be-transmitted multiple data blocks according to current traffic information of each data channel in the determined data channels.

Preferably, the service quality information includes: signal quality and a data transmission rate.

Preferably, the step of using the selected at least two data channels to transmit the to-be-transmitted data includes: selecting some or all of the data blocks from the multiple data blocks, and determining a currently available data channel for each of the selected data blocks; and establishing an HTTP connection on the determined data channel, and using the HTTP connection to transmit the to-be-transmitted data block.

Preferably, after the step of dividing the to-be-transmitted data into multiple data blocks according to a specified rule, the processor is further configured to execute the following operation: storing the divided multiple data blocks in a data block pool, where the data block pool is configured to store a data block; and the processor is further configured to execute the following operation: determining, in a process of transmitting the to-be-transmitted data, that a data channel on which a network exception occurs exists in the selected at least two data channels; and re-storing, in the data block pool, a data block that is currently being transmitted on the data channel on which a network exception occurs, and re-selecting a currently available data channel for the data block that is re-stored in the data block pool.

Preferably, the processor is further configured to execute the following operations: if it is determined to use only a single data channel to transmit the to-be-transmitted data, determining whether data is currently being transmitted on a default activated channel; if no data is currently being transmitted on the default activated channel, selecting the default activated channel to transmit the to-be-transmitted data; and if data is currently being transmitted on the default activated channel, determining whether data transmission load of the default activated channel is less than a data transmission rate of the default activated channel; and if the data transmission load of the default activated channel is less than the data transmission rate of the default activated channel, selecting the default activated channel to transmit the to-be-transmitted data; or if the data transmission load of the default activated channel is not less than the data transmission rate of the default activated channel, selecting a data channel that matches a service type of the to-be-transmitted data to transmit the to-be-transmitted data, and deactivating the default activated channel.

Preferably, the step of selecting a data channel that matches a service type of the to-be-transmitted data to transmit the to-be-transmitted data, and deactivating the default activated channel includes: determining whether the data channel that matches the service type of the to-be-transmitted data has remaining data traffic; if the data channel that matches the service type of the to-be-transmitted data has remaining data traffic, selecting the data channel that matches the service type of the to-be-transmitted data to transmit the to-be-transmitted data, and deactivating the default activated channel; or if the data channel that matches the service type of the to-be-transmitted data does not have remaining data traffic, selecting the default activated channel to transmit the to-be-transmitted data.

Preferably, the processor is further configured to execute the following operations: detecting whether a data channel whose data traffic is used up exists in the selected at least two data channels; and if a data channel whose data traffic is used up exists in the selected at least two data channels, stopping using the data channel whose data traffic is used up to transmit the to-be-transmitted data.

Preferably, the processor is further configured to execute the following operations: detecting a temperature of the mobile terminal in the process of transmitting the to-be-transmitted data; and if the temperature of the mobile terminal exceeds a set threshold, stopping transmission of the to-be-transmitted data.

Preferably, the mobile terminal is a multi-card mobile terminal, and the multiple data channels of the mobile terminal include data channels supported by all mobile terminal cards of the mobile terminal.

The processor in this embodiment is configured to implement a corresponding data transmission method in the foregoing multiple method embodiments, and has beneficial effects of a corresponding method embodiment. Details are not described herein.

Embodiment 8

Figure 9:
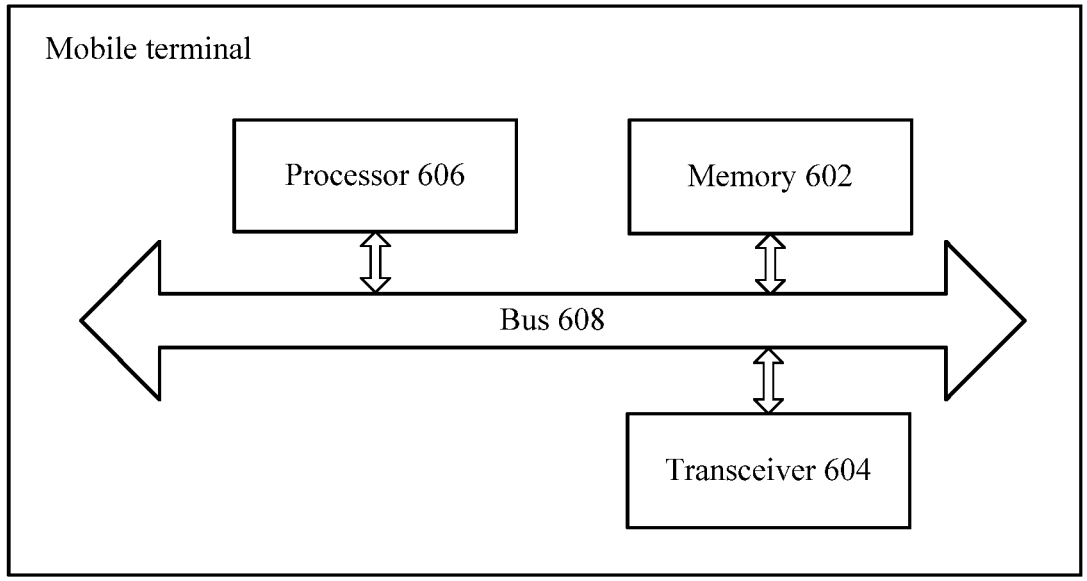
FIG. 9 is a schematic structural diagram of a mobile terminal according to Embodiment 8 of the present invention.

Referring to FIG. 9, FIG. 9 shows a schematic structural diagram of a mobile terminal according to Embodiment 8 of the present invention.

The mobile terminal in this embodiment includes: a memory 602, a transceiver 604, the processor 606 in Embodiment 7, and a bus 608. The memory 602, the transceiver 604, and the processor 606 perform communication by using the bus 608.

The memory 602 is configured to store an instruction; the processor 606 is configured to execute, according to the instruction stored in the memory 602, an operation executed by the processor in Embodiment 7; and the transceiver 604 is configured to receive or send to-be-transmitted data according to the operation executed by the processor 606.

The memory 602 may be configured to store an instruction and a software program, and the processor 606 executes various functional applications of the mobile terminal and implements data processing, by running the instruction and the software program that are stored in the memory 602. In a specific implementation manner of the present invention, the memory 602 may include a volatile memory, such as a nonvolatile random access memory (NVRAM for short), a phase change random access memory (PRAM for short), or a magnetoresistive random access memory (MRAM for short), and may further include a non-volatile memory, such as at least one magnetic disk storage device, an electrically erasable programmable read-only memory (EEPROM for short), or a flash memory device such as an NOR flash memory or an NAND flash memory. The non-volatile memory stores an instruction executed by the processor 606. The processor 606 loads, from the non-volatile memory, a running instruction and data to a memory, and stores digital content in a massive storage apparatus.

The processor 606 is a control center of the mobile terminal and uses various interfaces and lines to connect all parts of the entire mobile terminal. The processor 606 executes various functions of the mobile terminal and/or processes data, by running or executing the instruction and/or the software program that are/is stored in the memory 602. The processor 606 may be formed by an integrated circuit (IC for short), for example, may be formed by a singly-encapsulated IC, or may be formed by multiple connected encapsulated ICs with a same function or different functions. For example, the processor 606 may include only a central processing unit (CPU for short), or may be a combination of a graphics processing unit (GPU), a digital signal processor (DSP for short), and a control chip (for example, a baseband chip) in a communications unit. In an implementation manner of the present invention, the CPU may be a single computing core, or may include multiple computing cores.

In a processing procedure, the processor 606 may transmit information, and receive or send to-be-transmitted data with help of the transceiver 604, the bus 608, and a necessary auxiliary circuit (such as an antenna).

The mobile terminal in this embodiment is configured to implement a corresponding data transmission method in the foregoing multiple method embodiments, and has beneficial effects of a corresponding method embodiment. Details are not described herein.

Embodiments in this specification are all described in a progressive manner. Each embodiment focuses on a difference from other embodiments, and for same or similar parts in the embodiments, reference may be made to these embodiments. A mobile terminal embodiment is described relatively simply because it is basically similar to method embodiments, and for portions related to those of the method embodiments, reference may be made to the description of the method embodiments.

Algorithms and displays that are provided herein are not inherently associated with any specific mobile terminal, virtual system, or another device. Various general purpose systems may also be used together with the teaching based on these embodiments. According to the foregoing descriptions, a structure required to construct a system of this type is obvious. In addition, the present invention is not designed for any specific programming language. It should be understood that content of the present invention described herein may be implemented by using various programming languages, and the foregoing description made for the specific language is intended to disclose examples of implementation manners of the present invention.

A large quantity of details are described in the specification provided herein. However, it can be understood that the embodiments of the present invention may be practiced without these details. Detailed descriptions of a well-known method, structure, and technology are omitted in some embodiments in order not to blur understanding of this specification.

Similarly, it should be understood that, to streamline this disclosure and help understand one or more of the various aspects of the invention, in the foregoing descriptions of embodiments of the present invention made for illustration purposes, various features of the present invention are sometimes grouped into a single embodiment, a drawing, or their respective descriptions. However, a way of disclosing should not be interpreted as reflecting the following intention: the contemplated present invention requires more features than those clearly disclosed in each claim. More accurately, as reflected in the claims below, the aspects of invention are less than all features of a single embodiment that is previously disclosed. Therefore, the claims that follow a specific implementation manner definitely incorporate the specific implementation manner. Each claim serves as a separate embodiment of the present invention.

Persons skilled in the art may understand that modules in devices in the embodiments may be adaptively changed and be disposed in one or more devices that are different from those of these embodiments. Modules or units or components in the embodiments may be combined into a module or a unit or a component, and additionally, may be divided into a plurality of submodules or subunits or subcomponents. Except a fact that at least some of these features and/or processes or units are mutually exclusive, all disclosed features and all processes or units of any method or device that are disclosed in such a way in this specification (including the appended claims, the abstract, and the accompanying drawings) may be combined in any combination mode. Unless otherwise explicitly stated, each feature disclosed in this specification (including the appended claims, the abstract, and the accompanying drawings) may be replaced by an alternative feature that serves same, equivalent, or similar purposes.

In addition, persons skilled in the art can understand that, although some embodiments described herein include some features included in another embodiment instead of including another feature, a combination of features of different embodiments means falling within the scope of the present invention and forming different embodiments. For example, in the following claims, any one of the contemplated embodiments may be used in any combination mode.

Embodiments of various parts in the present invention may be implemented by hardware, or software modules running on one or more processors, or a combination thereof. Persons skilled in the art should understand that in practice, a microprocessor or a digital signal processor (DSP) may be configured to implement some or all functions of some or all parts in a device that is searched according to the embodiments of the present invention. The present invention may further be implemented as a part or all of devices or device programs (such as a computer program and a computer program product) configured to perform the methods described herein. The programs implementing the present invention may be stored in a computer-readable medium, or may have one or more forms of signals. Such signals may be downloaded from an Internet site, or provided on a carrier signal, or provided in any other form.

Figure 10:
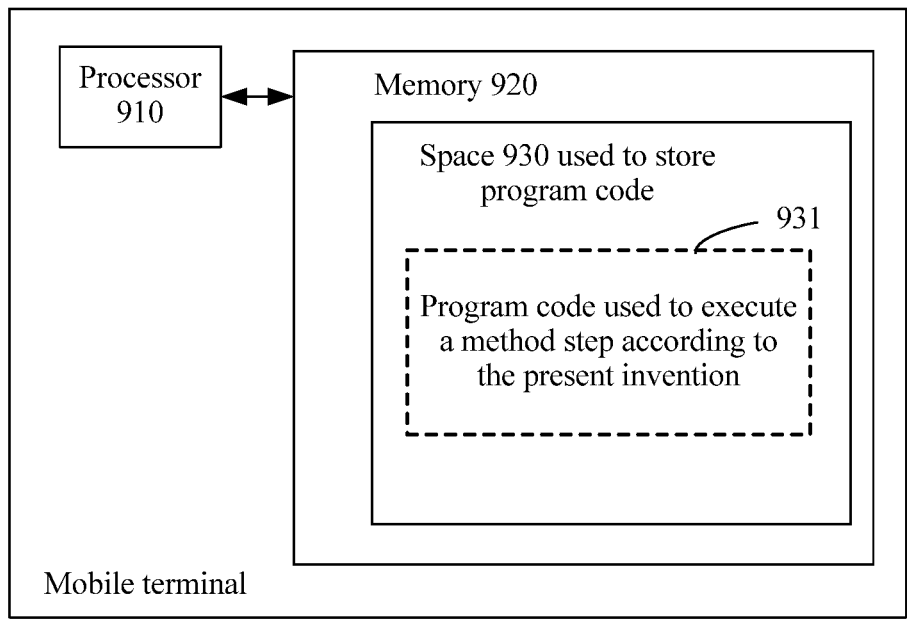
FIG. 10 is a schematic diagram of a mobile terminal configured to perform a method according to the present invention.
Figure 11:
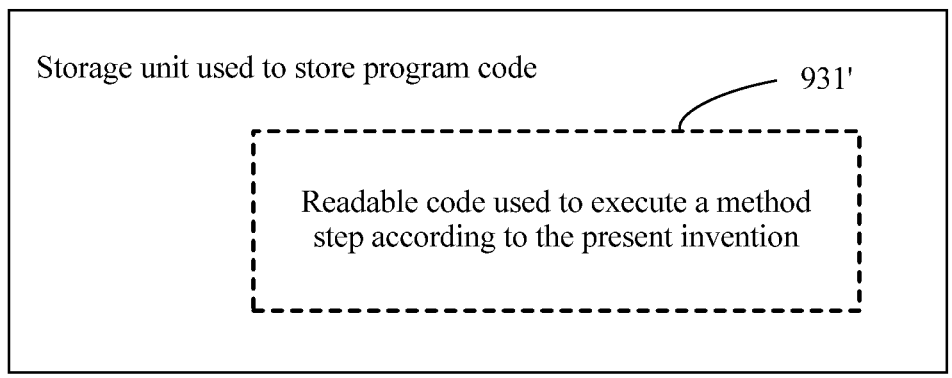
FIG. 11 is a schematic diagram of a storage unit configured to keep or carry program code that implements a method according to the present invention.

For example, FIG. 10 shows a mobile terminal, such as a mobile phone, that may implement a method that is searched according to the present invention. The mobile terminal conventionally includes a processor 910 and a computer program product or a computer-readable medium that is in a form of a memory 920. The memory 920 may be an electronic memory such as a flash memory, an EEPROM (electrically erasable programmable read-only memory), an EPROM, a hard disk, or a read only memory (ROM). The memory 920 has storage space 930 of program code 931 that is used to execute any method step in the foregoing methods. For example, the storage space 930 used to store the program code may include program code 931 that is used to implement steps in the foregoing methods. The program code may be read from one or more computer program products or written into the one or more computer program products. These computer program products include a program code carrier such as a hard disk, a compact disk (CD), a memory card, or a floppy disk. Such a computer program product is generally a portable or fixed storage unit, as shown in FIG. 11. The storage unit may have a storage section, storage space, and like that are similar to those arranged in the memory 920 in a server in FIG. 10. The program code may be compressed in an appropriate form. Generally, the storage unit includes computer-readable code 931', that is, code that may be read by a processor such as the processor 910. When the code is executed by the server, the server performs various steps in the methods described above.

The "one embodiment," "embodiment," or "one or more embodiments" mentioned in this specification means that a specific characteristic, structure, or feature described with reference to an embodiment is included in at least one embodiment of the present invention. In addition, it should be noted that a phrase like "in one embodiment" herein may not all refer to a same embodiment.

A large quantity of details are described in the specification provided herein. However, it can be understood that the embodiments of the present invention may be practiced without these details. Detailed descriptions of a well-known method, structure, and technology are omitted in some embodiments in order not to blur understanding of this specification. It should be noted that the foregoing embodiments are intended for describing the present invention, instead of limiting the present invention, and persons skilled in the art may design an alternative embodiment without departing from the scope of the appended claims. In the claims, any reference symbol between the brackets shall not constitute any limitation on the claims. The word "comprise" does not exclude existence of an element or a step that is not listed in the claims. The word "a/an" or "one" preceding an element does not exclude existence of multiple such elements. The present invention may be implemented by hardware including several different elements and a computer that is appropriately programmed. In unit claims that list several apparatuses, some of the apparatuses may be specifically implemented by a same hardware item. Use of words first, second, third, and the like does not indicate any sequence. These words may be interpreted as names.

In addition, it should be further noted that the language used in this specification is merely selected for a purpose of readability and teaching, but not for explaining or limiting the subject of the present invention. Therefore, many modifications and variations are obvious to persons of ordinary skill in the art without departing from the scope and spirit of the appended claims. For the scope of the present invention, the disclosure of the present invention is illustrative, rather than limited, and the scope of the present invention is subject to the appended claims.

What is claimed is:

1. A method, comprising:
   determining, by a mobile terminal, to use multiple data channels to transmit to-be-transmitted data to a network-side device, wherein the to-be-transmitted data is data of one application;
   dividing, by the mobile terminal, the to-be-transmitted data into multiple data blocks according to a rule;
   determining, by the mobile terminal, current traffic information and service quality information of at least one of the multiple data channels;
   selecting, by the mobile terminal, at least two activated data channels of the multiple data channels to use to transmit the to-be-transmitted multiple data blocks according to the service quality information of the at least one of the multiple data channels; and
   using, by the mobile terminal, the selected at least two activated data channels to transmit the to-be-transmitted data to the network-side device, wherein using the selected at least two activated data channels comprises matching data blocks of the multiple data blocks to the at least two activated data channels based on the service quality information of the at least one of the multiple data channels.

2. The method according to claim 1, further comprising:
   activating, by the mobile terminal, at least two of the multiple data channels, to form the at least two activated data channels.

3. The method according to claim 1, wherein the service quality information of the at least one of the multiple data channels comprises:
   signal quality of the at least one of the multiple data channels; and
   a data transmission rate of the at least one of the multiple data channels.

4. The method according to claim 1, wherein the mobile terminal comprises at least one mobile terminal card, and the at least two activated data channels comprise a data channel supported by the at least one mobile terminal card.

5. The method according to claim 1, further comprising:
   detecting, by the mobile terminal, whether a data channel whose data traffic is used up exists in the selected at least two activated data channels; and
   in response to detecting that a data channel whose data traffic is used up exists in the selected at least two activated data channels, stopping using the data channel whose data traffic is used up to transmit the to-be-transmitted data.

6. The method according to claim 1, wherein using, by the mobile terminal, the selected at least two activated data channels to transmit the to-be-transmitted data to the network-side device further comprises:
   using, by the mobile terminal, the selected at least two activated data channels to simultaneously transmit the to-be-transmitted data to the network-side device, wherein the multiple data blocks are matched to the at least two activated data channels based on transmission rates of the at least two activated data channels.

7. The method according to claim 1, wherein determining, by the mobile terminal, to use multiple data channels to transmit to-be-transmitted data to the network-side device comprises:
   determining, by a mobile terminal, to use multiple data channels to transmit to-be-transmitted data to a network-side device in response to a multi-data channel transmission mode of the mobile terminal being activated.

8. The method according to claim 1, wherein determining, by the mobile terminal, to use multiple data channels to transmit to-be-transmitted data to the network-side device comprises:
   determining, by a mobile terminal, to use multiple data channels to transmit to-be-transmitted data to the network-side device based on a transmission time requirement of the to-be-transmitted data.

9. The method according to claim 1, wherein for each data channel of the multiple data channels, the current traffic information of the respective data channel indicates remaining available data traffic of the respective data channel.

10. The method according to claim 1, wherein each of the multiple data channels is activated before selecting, by the mobile terminal, the at least two activated data channels of the multiple data channels, and a quantity of the at least two activated data channels is less than a quantity of the multiple data channels.

11. A mobile terminal, comprising:
    a processor;
    a non-transitory memory storing programming instructions executable by the processor, the programming instructions including instructions to:
      determine to use multiple data channels to transmit to-be-transmitted data to a network-side device, wherein the to-be-transmitted data is data of one application;
      divide the to-be-transmitted data into multiple data blocks according to a specified rule;
      determine current traffic information and service quality information of at least one of the multiple data channels;
      select at least two activated data channels of the multiple data channels to use to transmit the to-be-transmitted multiple data blocks according to the service quality information of the at least one of the multiple data channels; and
      use the selected at least two activated data channels to transmit the to-be-transmitted data to the network-side device, wherein using the selected at least two activated data channels comprises matching data blocks of the multiple data blocks to the at least two activated data channels based on the service quality information of the at least one of the multiple data channels.

12. The mobile terminal according to claim 11, wherein the programming instructions further include instructions to:
activate at least two of the multiple data channels, to form the at least two activated data channels.

13. The mobile terminal according to claim 11, wherein the service quality information of the at least one of the multiple data channels comprises:
signal quality of the at least one of the multiple data channels; and
a data transmission rate of the at least one of the multiple data channels.

14. The mobile terminal according to claim 11, wherein the mobile terminal comprises at least one mobile terminal card, and the at least two activated data channels comprise a data channel supported by the at least one mobile terminal card.

15. The mobile terminal according to claim 11, wherein the programming instructions further include instructions to:
detect whether a data channel whose data traffic is used up exists in the selected at least two activated data channels; and
in response to detecting that a data channel whose data traffic is used up exists in the selected at least two activated data channels, stop using the data channel whose data traffic is used up to transmit the to-be-transmitted data.

16. A non-transitory computer-readable storage medium storing programming instructions executable by at least one processor, the programming instructions including instructions to:
determine to use multiple data channels to transmit to-be-transmitted data to a network-side device, wherein the to-be-transmitted data is data of one application;
divide the to-be-transmitted data into multiple data blocks according to a rule;
determine current traffic information and service quality information of at least one of the multiple data channels;

select at least two activated data channels of the multiple data channels to use to transmit the to-be-transmitted multiple data blocks according to the service quality information of the at least one of the multiple data channels; and
use the selected at least two activated data channels to transmit the to-be-transmitted data to the network-side device, wherein using the selected at least two activated data channels comprises matching data blocks of the multiple data blocks to the at least two activated data channels based on the service quality information of the at least one of the multiple data channels.

17. The non-transitory computer-readable storage medium according to claim 16, wherein the programming instructions further include instructions to:
activate at least two of the multiple data channels, to form the at least two activated data channels.

18. The non-transitory computer-readable storage medium according to claim 16, wherein the service quality information of the at least one of the multiple data channels comprises:
signal quality of the at least one the multiple data channels; and
a data transmission rate of the at least one of the multiple data channels.

19. The non-transitory computer-readable storage medium according to claim 16, wherein a mobile terminal comprises at least one mobile terminal card, and the at least two activated data channels comprise a data channel supported by the at least one mobile terminal card.

20. The non-transitory computer-readable storage medium according to claim 16, wherein the programming instructions further include instructions to:
detect whether a data channel whose data traffic is used up exists in the selected at least two activated data channels; and
in response to a data channel whose data traffic is used up existing in the selected at least two activated data channels, stop using the data channel whose data traffic is used up to transmit the to-be-transmitted data.

* * * * *